United States Patent [19]

Yajima et al.

[11] 4,100,233
[45] Jul. 11, 1978

[54] SILICON CARBIDE FIBERS HAVING A HIGH STRENGTH AND A METHOD FOR PRODUCING SAID FIBERS

[75] Inventors: Seishi Yajima; Josaburo Hayashi; Mamoru Omori, all of Oharai, Japan

[73] Assignee: The Research Institute for Iron, Steel and other Metals of the Tohoku University, Sendai, Japan

[21] Appl. No.: 677,960

[22] Filed: Apr. 19, 1976

[30] Foreign Application Priority Data

| Apr. 25, 1975 | [JP] | Japan | 50-50529 |
| May 2, 1975 | [JP] | Japan | 50-52471 |
| May 2, 1975 | [JP] | Japan | 50-52472 |
| May 16, 1975 | [JP] | Japan | 50-58033 |
| May 16, 1975 | [JP] | Japan | 50-58034 |
| Jun. 11, 1975 | [JP] | Japan | 50-70302 |
| Jun. 11, 1975 | [JP] | Japan | 50-70303 |
| Jun. 23, 1975 | [JP] | Japan | 50-77219 |
| Jun. 30, 1975 | [JP] | Japan | 50-79972 |
| Sep. 4, 1975 | [JP] | Japan | 50-107371 |

[51] Int. Cl.$^2$ .................................................. C01B 31/36
[52] U.S. Cl. ............................................... 423/345; 264/65
[58] Field of Search ................. 423/345, 439, 346; 260/46.5 R, 46.5 H, 46.5 E, 46.5 P; 204/159.13; 264/56, 63, 65; 106/44

[56] References Cited

U.S. PATENT DOCUMENTS

| 3,246,950 | 4/1966 | Gruber | 106/44 |
| 3,386,840 | 6/1968 | Gruber | 106/44 |
| 3,403,008 | 9/1968 | Hamling | 423/345 |
| 3,433,725 | 3/1969 | Hough et al. | 204/164 |
| 3,529,044 | 9/1970 | Santangelo | 264/65 |
| 3,632,715 | 1/1972 | Gowdy et al. | 205/159.13 |
| 3,640,693 | 2/1972 | Galasso et al. | 423/345 |
| 3,652,711 | 3/1972 | Triem et al. | 204/159.13 |

FOREIGN PATENT DOCUMENTS

| 2,236,078 | 3/1974 | Fed. Rep. of Germany. |

*Primary Examiner*—Earl C. Thomas
*Assistant Examiner*—Wayne A. Langel
*Attorney, Agent, or Firm*—Ladas, Parry, Von Gehr, Goldsmith & Deschamps

[57] ABSTRACT

Silicon carbide fibers having a high tensile strength are produced by (1) dissolving at least one of organosilicon high molecular weight compounds having a softening point of higher than 50° C, in which silicon and carbon are the main skeleton components, in a solvent for the organosilicon high molecular weight compounds or heating and melting said organosilicon high molecular weight compounds to prepare a spinning solution and spinning said spinning solution into filaments, (2) preliminarily heating the spun filaments at a temperature of 350°–800° C under vacuum to volatilize low molecular weight compounds contained in the high molecular weight compounds, and (3) baking the thus treated filaments at a temperature of 800°–2,000° C under vacuum or at least one non-oxidizing atmosphere selected from the group consisting of an inert gas, CO gas and hydrogen gas, to form silicon carbide fibers.

44 Claims, 24 Drawing Figures

FIG_1
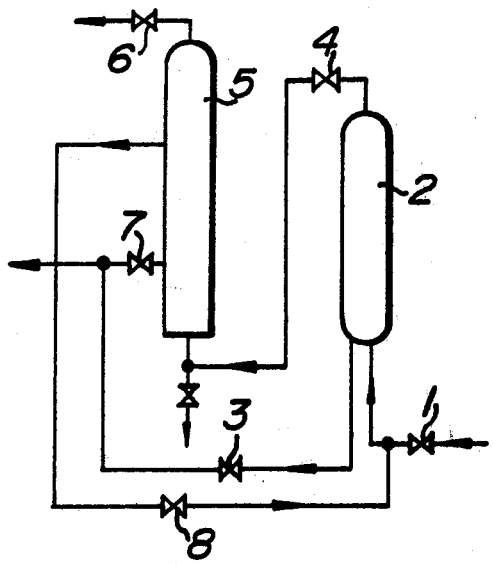
FIG_2
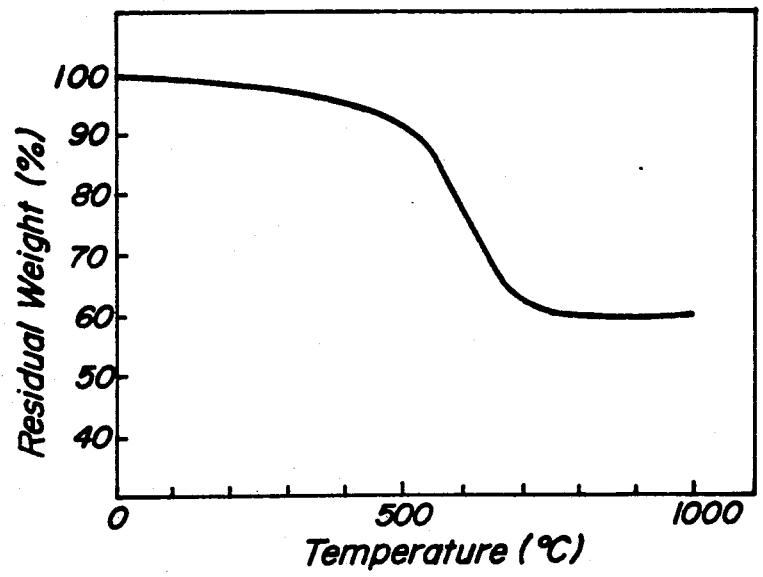

FIG_3
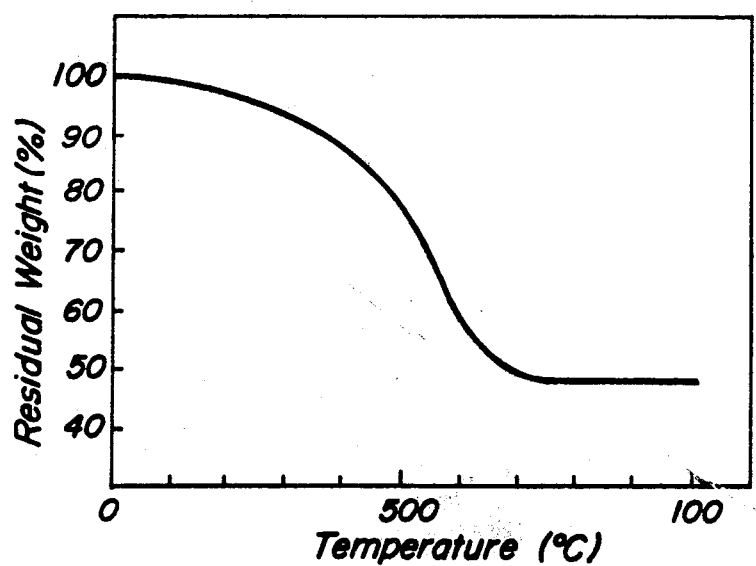
FIG_4
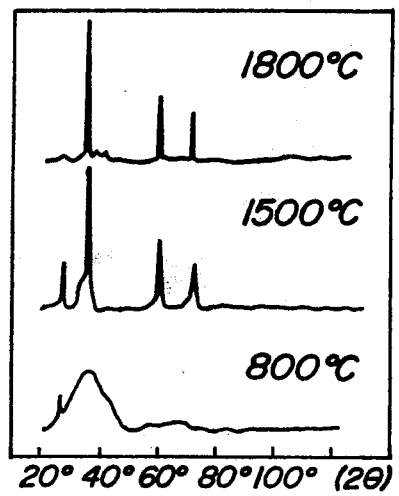

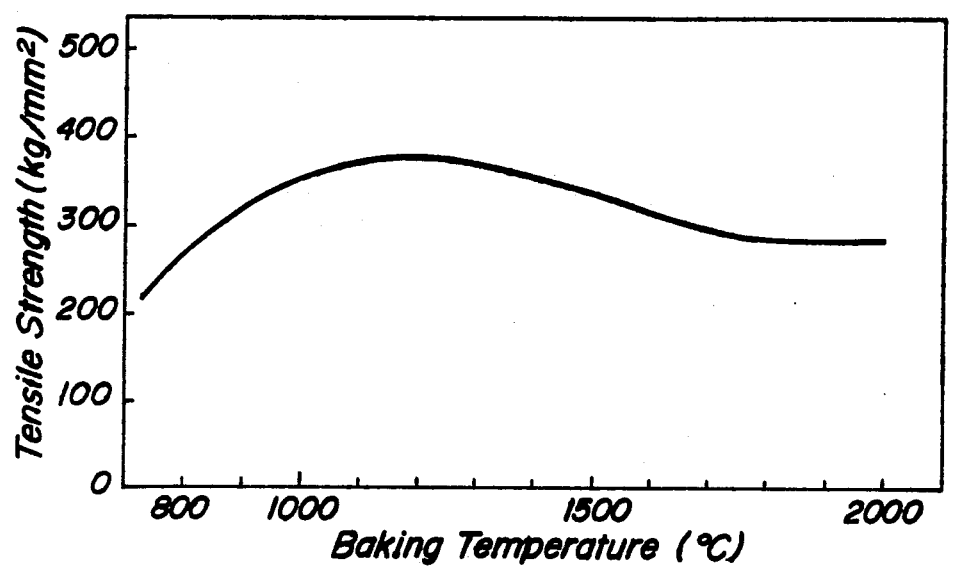
FIG_9

FIG_10
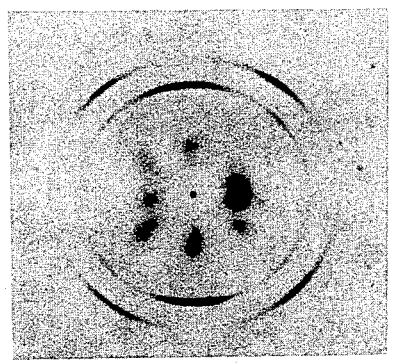
FIG_11
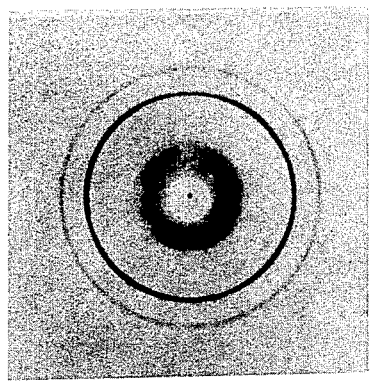

FIG_15
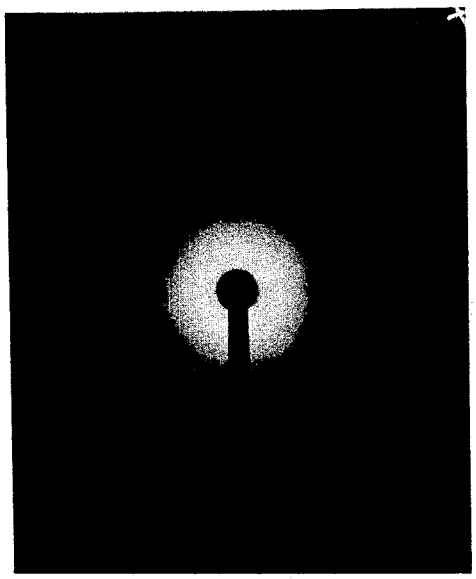
FIG_16
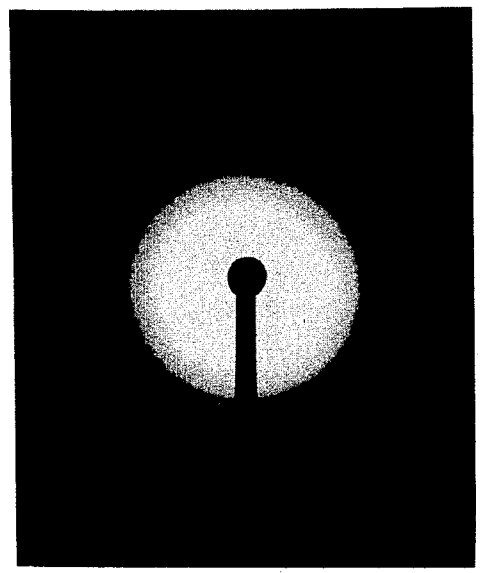

FIG_17
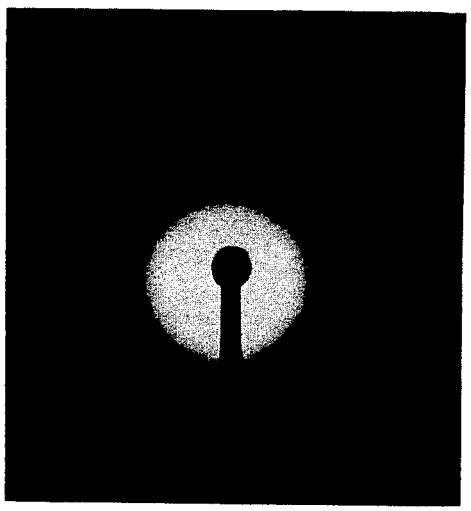

FIG_20
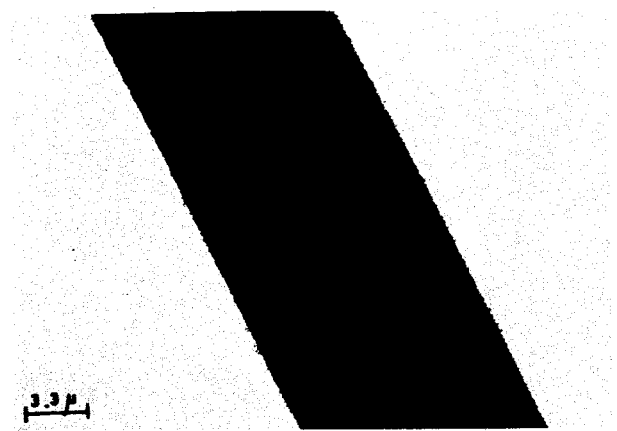
FIG_21
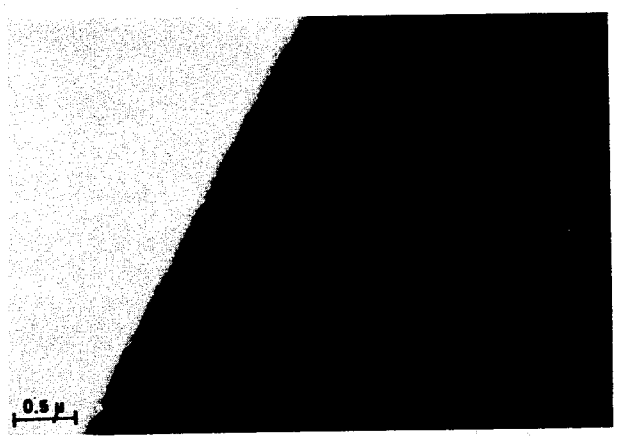

FIG_22
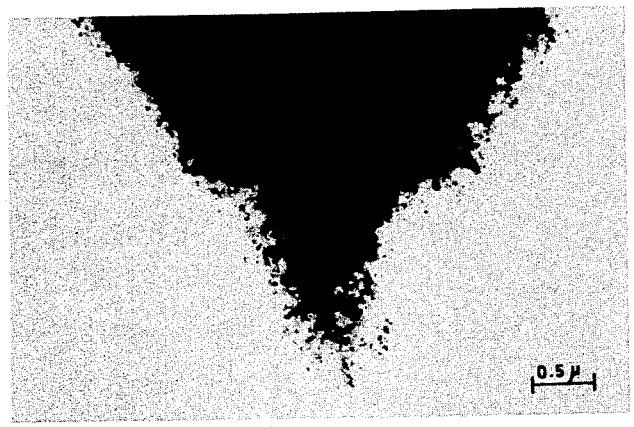
FIG_23
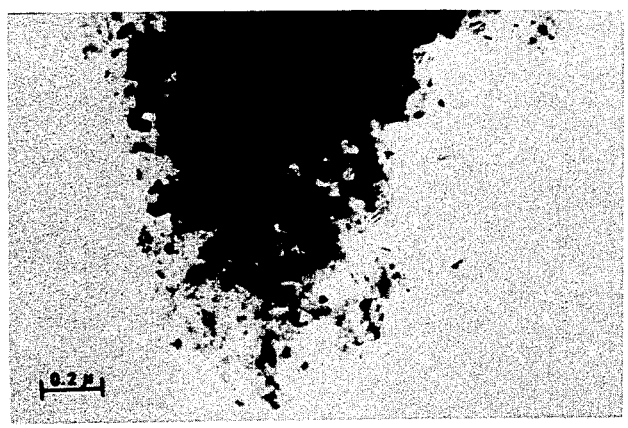

SILICON CARBIDE FIBERS HAVING A HIGH STRENGTH AND A METHOD FOR PRODUCING SAID FIBERS

The present invention relates to silicon carbide fibers having a high strength and a method for producing said fibers.

Silicon carbide is a compound shown by a chemical formula of SiC and is usually produced in a block form by reacting $SiO_2$ with C at a high temperature of about 1,900°–2,200° C.

Accordingly it is necessary in order to produce a silicon carbide molding having a particularly defined shape that the above described block is pulverized and a binder is added to the pulverized silicon carbide and the resulting mixture is molded and then sintered.

However, it has been impossible to produce fibrous silicon carbide moldings through the above described process. U.S. Pat. No. 3,433,725 discloses a method for producing silicon carbide fibers by reacting carbon fibers with $SiCl_4$ gas which is being supplied, within a temperature range of 800°–1,200° C. U.S. Pat. No. 3,403,008 also teaches production of silicon carbide fibers and moldings, in which viscose rayon tows are immersed in liquid silicon tetrachloride to form rayon silicate and then the formed rayon silicate is baked up to 1,000°–2,000° C at a rate of 50° C/hr under vacuum of 1–10 mmHg in a tubular oven to form silicon carbide fibers. However, in the silicon carbide fibers produced in the above described process, crystal grains of SiC constituting the fibers are large, the strength is low, the diameter of the fibers is relatively large, the production cost is high and the application is considerably limited.

The inventors have found that silicon carbide fibers having a high strength can be produced by the following steps, (1) a step for producing organosilicon high molecular weight compounds, in which silicon and carbon are the main skeleton components, by polycondensation reaction through at least one already well known process of addition of a polycondensation catalyst, irradiation and heating, (2) a step for obtaining organosilicon high molecular weight compounds, of which a softening point is higher than 50° C, (3) a step for producing a spinning solution from said organic high molecular weight compound and spinning said solution into filaments, (4) a step for preliminarily heating the spun filaments under vacuum, and (5) baking the thus treated filaments at a high temperature under vacuum or atmosphere of inert gas, CO gas or hydrogen gas to form SiC fibers.

The present invention will be explained hereinafter in detail.

The organosilicon compounds of the starting materials for producing the organosilicon high molecular weight compounds, in which silicon and carbon are the main skeleton components, and which are to be used for the spinning are classified into the following groups (1)–(10). (1) Compounds having only Si-C bond:

Silahydrocarbons, such as $R_4Si$, $R_3Si(R'SiR_2)_nR'SiR_3$, carbon-functional derivatives thereof belong to this group. For example,
$(CH_3)_4Si$, $(CH_2=CH)_4Si$, $(CH_3)_3SiC \equiv CSi(CH_3)_3$, $(CH_2)_5Si(CH_2)_4$, $(C_2H_5)_3SiCH_2CH_2Cl$, $(C_6H_5)_3SiCO_2H$,

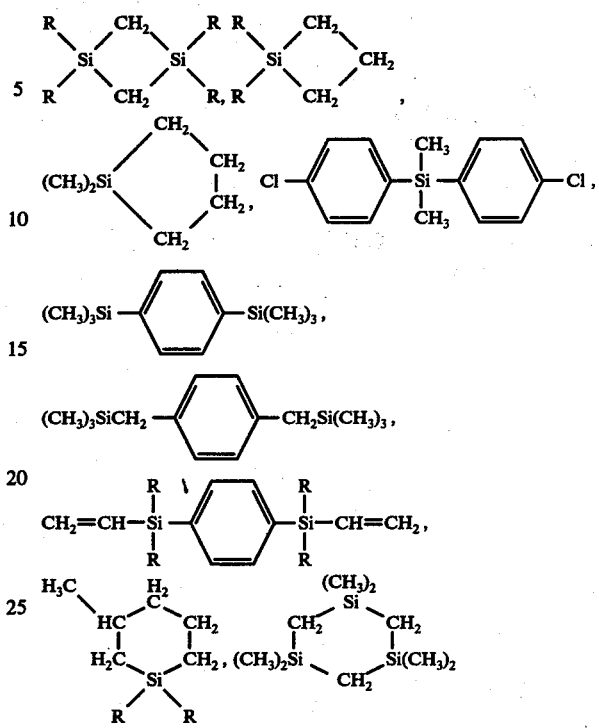

(2) Compounds having Si-H bond in addition to Si-C bond:

Mono-, di-, and triorganosilanes belong to this group.
For example,
$(C_2H_5)_2SiH_2$, $(CH_2)_5SiH_2$, $(CH_3)_3SiCH_2Si(CH_3)_2H$, $ClCH_2SiH_3$,

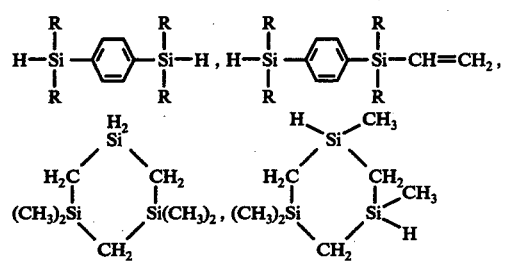

(3) Compounds having Si-Hal bond:
Organohalogensilanes.
For example,
$CH_2=CHSiF_3$, $C_2H_5SiHCl_2$, $(CH_3)_2(ClCH_2)SiSi(CH_3)_2Cl$, $(C_6H_5)_3SiBr$,

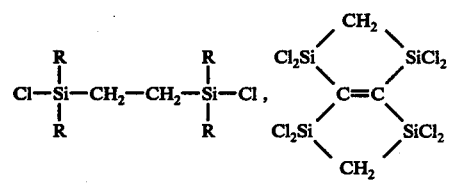

(4) Compounds having Si-N bond:
Silylamines belong to this group.
For example,

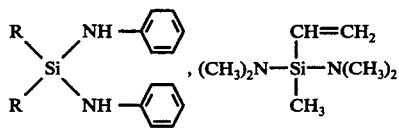, 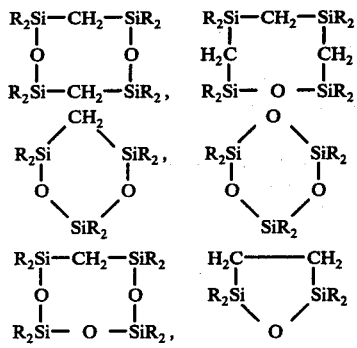

(5) Si-OR organoalkoxy (or aroxy) silanes:
For example,
(CH$_3$)$_2$Si(OC$_2$H$_5$)$_2$, C$_2$H$_5$SiCl$_2$(OC$_2$H$_5$), p-ClC$_6$H$_4$OSi(CH$_3$)$_3$,

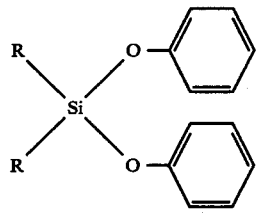

(6) Compounds having Si-OH bond:
Organosilanes.
For example,
(C$_2$H$_5$)$_3$SiOH, (CH$_3$)$_2$Si(OH)$_2$, C$_6$H$_5$Si(OH)$_3$, (HO)(CH$_3$)$_2$SiCH$_2$Si(CH$_3$)$_2$.(OH),

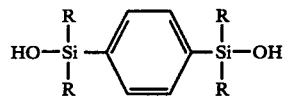

(7) Compounds having Si-Si bond:
For example,
(CH$_3$)$_3$SiSi(CH$_3$)$_2$Cl, (CH$_3$)$_3$SiSi(CH$_3$)$_3$,
(C$_6$H$_5$)$_3$SiSi(C$_6$H$_5$)$_2$Si(C$_6$H$_5$)$_2$Cl,

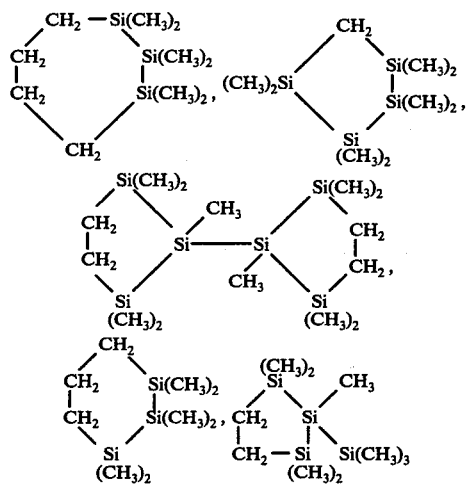

(8) Compounds having Si-O-Si bond:
Organosiloxanes.
For Example,
(CH$_3$)$_3$SiOSi(CH$_3$)$_3$, HO(CH$_3$)$_2$SiOSi(CH$_3$)$_2$OH,
Cl$_2$(CH$_3$)SiOSi(CH$_3$)ClOSi(CH$_3$)Cl$_2$, [(C$_6$H$_5$)$_2$SiO]$_4$,
CH$_2$=C(CH$_3$)CO$_2$CH$_2$Si.(CH$_3$)$_2$C-H$_2$O$_2$C(CH$_3$)=CH$_2$ (9) Esters of organosilicon compounds:
Esters formed from silanols and acids.
(CH$_3$)$_2$Si(OCOCH$_3$)$_2$

(10) Peroxides of organosilicon compounds:
(CH$_3$)$_3$SiOOC.(CH$_3$)$_3$, (CH$_3$)$_3$SiOOSi(CH$_3$)$_3$ In the above formulae, R shows alkyl or aryl groups.
From these starting materials are produced organosilicon high molecular weight compounds, in which silicon and carbon are the main skeleton components. For example, compounds having the following molecular structures are produced.

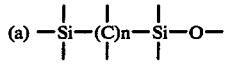

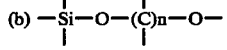

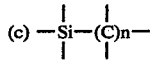

(d) The compounds having the above described skeleton components (a)–(c) as at least one partial structure in linear, ring and three dimensional structures or mixtures of the compounds having the above described skeleton components (a)–(c).

The compounds having the above described molecular structures are, for example as follows.

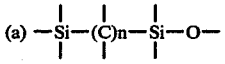

$n = 1$, poly(silmethylenesiloxane),
$n = 2$, poly(silethylenesiloxane),
$n = 6$, poly(silphenylenesiloxane)

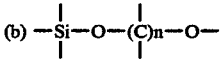

$n = 1$, poly(methyleneoxysiloxane),
$n = 2$, poly(ethyleneoxysiloxane),
$n = 6$, poly(phenyleneoxysiloxane),
$n = 12$, poly(diphenyleneoxysiloxane)

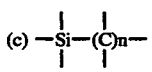

$n = 1$, polysilmethylene,
$n = 2$, polysilethylene,
$n = 3$, polysiltrimethylene,
$n = 6$, polysilphenylene,
$n = 12$, polysildiphenylene (d) The compounds having the above described skeleton components as at least one partial structure in linear, ring and three dimensional structures or mixtures of the compounds having the above described skeleton components (a)–(c).

The production of the organosilicon high molecular weight compounds in which silicon and carbon are the main skeleton components from the starting materials of the organosilicon compounds belonging to the above described groups (1)–(10) can be effected by polycondensation attained by subjecting the organosilicon compounds belonging to the above described groups (1)–(10) to at least one of irradiation, heating and addition of a catalyst for the polycondensation.

For example, some well known reaction formulae for obtaining the above described organosilicon high molecular weight compounds from the above described starting materials belonging to the groups (1)–(10) through at least one of addition of the catalyst, irradiation and heating, are exemplified as follows.

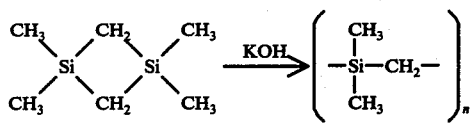  (1)

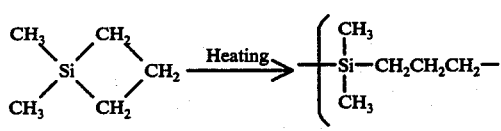  (2)

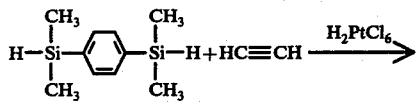  (3)

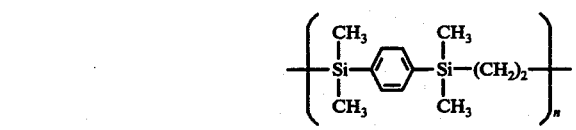  (4)

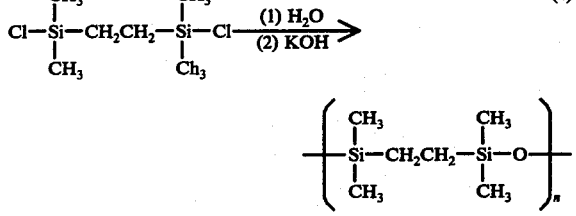  (5)

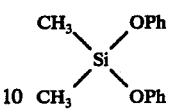

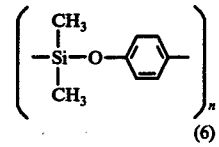  (6)

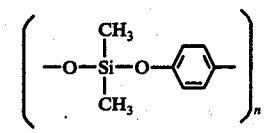

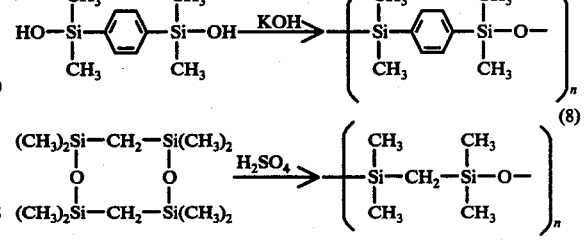  (7)

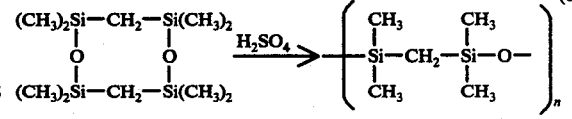  (8)

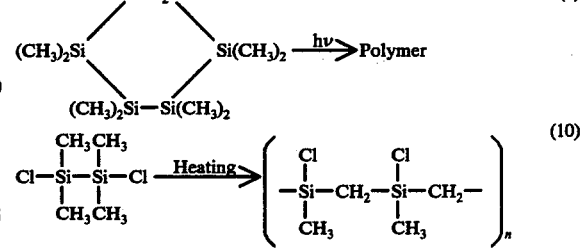  (9)

(10)

A more detailed explanation will be made with respect to the thermal polycondensation reaction. At least one organosilicon compound selected from the above described groups (1)–(10) is polymerized within a temperature range of 220°–1,500° C under vacuum, an inert gas, hydrogen gas, CO gas, $CO_2$ gas, a hydrocarbon gas or an organosilicon compound gas, if necessary, under pressure to produce the organosilicon high molecular weight compounds in which silicon and carbon are the main skeleton components.

The reason why the above described reaction should be effected within the temperature range of 200°–1,500° C is as follows. When the temperature is lower than 200° C, the synthesis reaction does not satisfactorily proceed, while when the temperature is higher than 1,500° C, the product becomes SiC compound and it is impossible to form fibers in the succeeding step, so that the temperature range must be 200° to 1,500° C and best results can be obtained within the temperature range of 300°–1,200° C.

In the above described synthesis reaction, a radical initiator of less than 10% may be added to the above described starting material. The above described radial initiators are, for example, benzoyl peroxide, di-tert.-butyl peroxyoxalate, di-tert.-butyl peroxide, azoisobutyronitrile and the like. The above described synthesis reaction does not always need these radical initiators, but this use permits to lower the temperature for starting the reaction by the succeeding heating or an average molecular weight of the reaction product can be increased.

When oxygen is present upon heating in the above described synthesis reaction, the radial polycondensation reaction does not occur due to oxygen or even if said reaction occurs, the reaction stops in the course, so that the polycondensation reaction must be effected by heating under at least one atmosphere of an inert gas, hydrogen gas, CO gas, $CO_2$ gas, a hydrocarbon gas, and an organosilicon compound gas or vacuum.

In the thermal polycondensaton reaction, a pressure is generated, so that it is not always necessary to apply particularly a pressure but when a pressure is applied, such pressure may be applied by means of at least one of an inert gas, hydrogen gas, CO gas, $CO_2$ gas, a hydrocarbon gas and an organosilicon silicon compound gas.

A mechanism in which the organosilicon high molecular weight compounds in which silicon and carbon are main skeleton components, are produced by the above described synthesis reaction, will be explained hereinafter, for example, in the case of synthesis from methylchlorosilane.

Methyl group of methylchlorosilane is decomposed into a methyl free radical and silyl free radical by the heating. The methyl free radical takes out hydrogen from methyl group bonded to silicon to form carbon free radical and methane gas is formed. On the other hand, hydrogen free radical is formed from methyl group bonded to silicon and at the same time carbon free radical is also formed. Presumably, the silyl free radical and the carbon free radical formed as described above bond to form silicon-carbon bond and the organosilicon high molecular weight compounds can be formed based on the above described reaction and the above described hydrogen free radical becomes hydrogen gas.

An embodiment of apparatus for the above described synthesis reaction is a stationary autoclave. In this case, the heating temperature is preferred to be 300°–500° C. Another embodiment for the above described synthesis reaction is shown in FIG. 1. In this drawing, from a valve 1 the starting material is fed into a heating reaction column 2 wherein the heating is effected at a temperature of 300°–1,500° C, preferably 500°–1,200° C, a part of the organosilicon high molecular weight compound for producing silicon carbide fibers of the present invention among the reaction products is discharged from the reaction column through a valve 3 and low molecular weight compounds formed in the heating reaction column 2 are fed into a separating column 5 through a valve 4 and in said column 5 distillation and separation are effected and the formed gas is discharged from the column through a valve 6 and a high molecular weight compound is taken out froum the column through a valve 7. The low molecular weight compounds separated in the tower 5 are circulated into the heating reaction column 2 through a valve 8.

The reason why the organosilicon high molecular weight compound in which silicon and carbon are the main skeleton components, are used for the starting material of spinning in the method of the present invention is that even if silicon or carbon is present as a side chain, this element is easily decomposed and volatilized by heating, while silicon and carbon constituting the skeleton components are not easily decomposed and volatilized by the heating and silicon and carbon bond at a high temperature to form silicon carbide.

The organosilicon high molecular weight compounds produced by the above described reactions, in which silicon and carbon are the main skeleton components, contain low molecular weight compounds soluble in an alcohol, such as methyl alcohol, ethyl alcohol, and the like or acetone and the like and the softening point of the resulting organic silicon high molecular weight compound depends upon the content of the low molecular weight compounds and there are the cases where the softening point becomes higher than 50° C and said point becomes lower than 50° C. As mentioned hereinafter, the softening point must be higher than 50° C for the starting material of spinning.

The low molecular weight compounds soluble in the solvent are mainly the low molecular weight compounds having an average molecular weight of 200–800, and when such compounds are contained in a large amount, the softening point of the organosilicon high molecular weight compounds is less than 50° C and in the step of preliminary heating of the spun filaments under vacuum, the above described low molecular weight substances melt and stick together with compounds having a slightly larger molecular weight than said compounds and further melt and bond with high molecular weight compounds having a larger molecular weight than the above described compounds having a slightly larger molecular weight, whereby the shape of the spun filament is lost. In the filament obtained by spinning organosilicon high molecular weight compounds having a softening point of higher than 50° C, wherein the content of the low molecular weight compound is small, the major portion of the above described low molecular weight compounds volatilizes upon the preliminary heating under vacuum and the shape of filament can be maintained. In addition, when the spun filaments are subjected to heating at a low temperature under an oxidizing atmosphere for formation of an oxide layer as explained hereinafter, the heating must be effected at a temperature of higher than 50° C and the fibers formed from the organosilicon high molecular weight compound having a softening point of lower than 50° C melt and stick with one another, when the oxidized layer is formed, and the shape of the filaments is lost.

In general, as the molecular weight of an organosilicon compound increases, the boiling point becomes higher and even if heating is effected under vacuum, the volatilization becomes difficult. For example, the boiling point of $Si_6C_{14}H_{36}$ (molecular weight: 372) under a reduced pressure of 1 mmHg is 150°–153° C, while the boiling point of $Si_9C_{27}H_{74}$ (molecular weight: 650) under a reduced pressure of 1 mmHg is 245°–300° C and even if the organosilicon compound having a larger molecular weight than that of $Si_9C_{27}H_{74}$ is heated under vacuum, such a compound does not substantially volatilize. For example, a solid organosilicon high molecular weight compound obtained by heating dodecamethylcyclohexasilane at 400° C for 48 hours under argon atmosphere in an autoclave is dissolved in hexane and the resulting solution is mixed with acetone and the product which is not dissolved in acetone, is produced. A relation of the heating temperature to the residual weight when the resulting product is heated under vacuum ($1 \times 10^{-3}$ mmHg), is shown in FIG. 2. As seen from FIG. 2 the weight decrease is not substantially observed at the heating temperature from room temperature to about 500° C. The residual weight when the above described high molecular weight compound containing a low molecular weight compound soluble in acetone is heated under vacuum, is shown in FIG. 3. As seen from FIG. 3, the weight decrease becomes large from above 200° C and at a temperature of about 500° C the weight decrease become further larger. The reason why the weight decrease of the high molecular weight compound containing the low molecular weight compound soluble in acetone becomes larger from about 200° C, is based on the fact that the low molecular weight compound contained in the high molecular weight compound volatilizes.

It has been found that when a larger amount of low molecular weight compound is contained and the softening point of the organic silicone high molecular weight compound is lower than 50° C, the content can be decreased by the following means.

In the first means, the organosilicon high molecular weight compound in which silicon and carbon are the main skeleton components, is treated with a solvent of alcohols, such as methyl alcohol and ethyl alcohol or acetone to extract the low molecular weight compounds and to obtain the high molecular weight compounds having a softening point of higher than 50° C.

In the production of spinning solution of the above described high molecular weight compound, in order to improve the softening point and viscosity it is possible to add the above described extracted low molecular weight compound to the high molecular weight compound, which is not extracted and remains, in such a range that the softening point does not become lower than 50° C.

In the second means, the organosilicon high molecular weight compound in which silicon and carbon are the main skeleton components, is sufficiently aged under vacuum or an atmosphere of air, oxygen, an inert gas, CO gas, ammonia gas, $CO_2$ gas, a hydrocarbon gas or an organosilicon compound gas, if necessary under pressure at a temperature range of 50°–700° C to polymerize the low molecular weight compounds in the organosilicon high molecular weight compound and to form the high molecular weight compound having a softening point of higher than 50° C. The atmosphere for effecting the aging is, for example, vacuum, air, oxygen, an inert gas, hydrogen gas, CO gas, ammonia gas, $CO_2$ gas, a hydrocarbon gas or an organosilicon compound gas and, if necessary the aging can be effected under pressure. When air, oxygen or ammonia gas is used, oxygen or nitrogen atom has cross-linking function, by which the low molecular weight compound is polymerized, so that these gases can be advantageously used. The above described various gas atmospheres are not always limited to one kind of gas and a mixed atmosphere of two or more gases may be used but in this case it is not desirable to mix the gases which reacts with each other.

The above described aging may be carried out under vacuum, atmospheric pressure or pressure and under vacuum an evaporation of the low molecular weight compound is promoted and under pressure the low molecular weight compound having a molecular weight of less than 1,000 contained in the organosilicon high molecular weight compound is not volatilized and polymerized to form the high molecular weight compound, so that the yield of production is improved.

When the temperature for aging the above described organosilicon high moleculr weight compound is lower than 50° C, the polymerization reaction is extremely slow and such a temperature is not economic, while said temperature exceeds 700° C, the above described high molecular weight compound is violently decomposed, so that the aging temperature must be within a range of 50°–700° C and the preferred temperature range for aging varies depending upon the kind of atmosphere, the kind of starting material, the average molecular weight of starting material and the like, but under air, oxygen or ammonia gas atmosphere, the desirable result can be obtained at a temperature of 80°–300° C and under an inert gas, hydrogen gas, CO gas, $CO_2$ gas, a hydrocarbon gas, or an organosilicon compound gas atmosphere, the preferable result can be obtained at a temperature of 120°–450° C.

The keeping time for said aging relates to the aging temperature and when the temperature is high, the keeping time may be short but at a high temperature, the decomposition and an excessive cross-linking reaction occur so that when the heating temperature is high, it is necessary to effect the heating for a short time. However, when the heating temperature is low, the heating time must be long. A better result can be obtained, when the heating is effected at a low temperature for a long time and in general, the keeping time of 0.5–100 hours are preferred under the above described preferred temperature.

The above described aging varies the molecular weight of the organosilicon high molecular weight compound and can make the spinning easy and the strength of the spun filament can be improved.

In the third means, the low molecular weight compound can be removed by distillation. This distillation includes distillation under atmospheric pressure, the distillation temperature becomes high but in the distillation under vacuum the molecular weight compound can be removed at a lower temperature than that in the distillation under atmospheric pressure. The distillation temperature is preferred to be 100°–500° C and when the distillation is effected at a temperature of lower than 100° C, the low molecular weight compound cannot be satisfactorily removed, while when the temperature is higher than 500° C, the distillation temperature is too high and the polycondensation reaction proceeds to such an extent that the obtained organosilicon high molecular weight compound cannot be spun into filament.

In the present invention when the organosilicon high molecular weight compounds obtained from the above described various organosilicon compounds by the well known polycondensation process, have a softening point of higher than 50° C, such organosilicon high molecular weight compounds can be directly used as the spinning material and such organosilicon high molecular weight compounds are dissolved in a solvent or melted by heating to form a spinning solution, which is spun into filament. The resulting filaments are preliminarily heated at a temperature of 350° to 800° C under vacuum and the preliminarily heated filaments are baked at a temperature of 800°–2,000° C under at least one of non-oxidizing atmospheres to produce silicon carbide fibers having high strength according to the present invention.

The organosilicon high molecular weight compounds having a low content of the above described molecular weight compounds are dissolved in a solvent capable of dissolving the organosilicon high molecular weight compounds, for example, benzene, toluene, xylene, ethylbenzene, styrene, cumene, pentane, hexane, octane, cyclopentadiene, cyclohexane, cyclohexene, methylene chloride, chloroform, carbon tetrachloride, 1,1-dichloroethane, 1,2-dichloroethane, methylchloroform, 1,1,2-trichloroethane, hexachloroethane, chlorobenzene, dichlorobenzene, ethyl ether, dioxane, tetrahydrofuran, methyl acetate, ethyl acetate, acetonitrile, carbon disulfide and the like, to produce a spinning solution, which is filtered to remove harmful substances in the spinning, such as macrogel, impurities and the like, and then the spinning solution is spun in a dry process by means of a spinning apparatus for synthetic fibers generally used and the spun filaments are subjected to a large draft to obtain fine filament.

In this case, when the atmosphere in the spinning tube of the spinning apparatus is a mixed atmosphere of the saturated vapor of at least one of the above described solvents with air or an inert gas, or air, an inert gas, heated air, a heated inert gas or steam, the solidification of spun filaments in the spinning tube can be controlled.

In addition to the production of the spinning solution by using the above described solvents, the above described organosilicon high molecular weight compounds having a softening point of higher than 50° C are heated and melted and the melt is filtered to remove the harmful substances in the spinning, such as macrogel, impurities and the like and the thus treated melt is spun through the above described spinning apparatus. The temperature of the melt in the spinning varies depending upon the softening point of the organosilicon high molecular weight compounds, but the temperature range of 50°–400° C is advantageous. In the above described spinning apparatus, if necessary, there is provided with a spinning tube and in the spinning tube in which atmosphere is air, an inert gas, a heated air, a heated inert gas or steam, a large draft is applied to obtain fine fibers. The spinning rate in said melt spinning varies depending upon an average molecular weight, a molecular weight distribution and the molecular structure of the organosilicon high molecular weight compound, but is preferable to be 50–5,000 m/min.

The spun filaments are subjected to the preliminary heating at a temperature of 350°–800° C under vacuum. The object of the preliminary heating is as follows. The low molecular weight compounds slightly remain in the spun filaments and the low molecular weight compounds formed in the polycondensation reaction and by the decomposition reaction owing to heating have a solvent function which dissolves the spun filaments and if a baking at a high temperature as explained hereinafter is carried out in such a state that these low molecular weight compounds are present, the spun filaments are dissolved and the shape of the filaments cannot be kept. Accordingly, these low molecular weight compounds should be evaporated by the preliminary heating. The time of the preliminary heating should be enough to fully remove these low molecular weight compounds.

In the above described preliminary heating under vacuum, evaporation of the easily volatile components becomes violent from about 500° C and the evaporation becomes weak at about 700° C as seen from FIG. 2. When the baking at a high temperature is carried out after the low molecular weight compounds are evaporated and removed by the preliminary heating, the reaction for forming silicon carbide favorably proceeds and the silicon carbide fibers having a high strength can be obtained.

In the baking at a high temperature, the original formation of silicon carbide is observed from about 800° C by X-ray diffraction as shown in FIG. 4. When the temperature is further raised, the crystal of silicon carbide grows. However, when the temperature exceeds 2,000° C, silicon carbide decomposes, so that the temperature in the baking at a high temperature must be 800°–2,000° C.

In the practice of the present invention, baking at a high temperature may be effected under various atmospheres. After the preliminary heating up to about 800° C under vacuum in order to evaporate the easily volatile components, the baking effected at a temperature of 800°–2,000° C under an inert gas, CO gas or hydrogen gas atmosphere can provide silicon carbide fibers having a high strength.

The tensile strength when the silicon carbide fibers are heated at a temperature of 700°–2,000° C is shown in FIG. 5 and the heating at a temperature of 1,000°–1,500° C provides the maximum tensile strength. The result of X-ray diffraction shows that the state of amorphous, semi-amorphous or ultra fine grain silicon carbide is maintained up to 1,500° C and when the temperature exceeds 1,500° C, silicon carbide crystal grows, so that the strength lowers. Accordingly, the high tensile strength can be obtained in the state of the amorphous, semi-amorphous or ultra fine grain silicon carbide.

Furthermore, it has been found that when the spun filaments are heated under an oxidizing atmosphere at a low temperature of 50°–400° C, particularly, 150°–300° C for several minutes to 10 hours prior to the preliminary heating, a thin oxide layer is formed on the surface of the filaments and the filaments are not melted at the succeeding preliminary heating and the stickiness of mutual filaments can be prevented. If such a heating treatment at a low temperature under an oxidizing atmosphere is carried out, it is not always necessary to effect the succeeding preliminary heating treatment under vacuum and the preliminary heating can be carried out under a non-oxidizing atmosphere, such as an inert gas, CO gas, hydrogen gas, a hydrocarbon gas or an organosilicon compound gas.

The atmosphere in the above described heating at a low temperature is preferred to be oxidizing gaseous atmosphere selected from the group consisting of air, ozone, oxygen, chlorine gas and bromine gas and even if the heating under the above described gaseous atmosphere is carried out at a temperature of lower than 50° C, said oxide layer cannnot be formed on the filaments, while at a temperature of higher than 400° C the oxidation of the filaments excessively exceed, so that the temperature range of 50°–400° C is preferable. The time for such a heating step depends upon the temperature and is from several minutes to 10 hours.

As the atmosphere for this heating step an aqueous solution of $KMnO_4$, $K_2Cr_2O_7$, $H_2O_2$ and the other inorganic peroxides can be used and in this case, the temperature is preferred to be from room temperature to 100° C and the time is preferred to be 0.5 to 10 hours.

When a tension is applied in the above described heating under an oxidizing atmosphere, such as tension is satisfied in such an amount that the wave-formed shrinkage of the spun filaments can be prevented and the object can be attained by a slight tension, but in order to practically effect the heating at a low temperature under a tension, a tension of 0.001–5 $Kg/mm^2$ provides a good result and even if a tension of less than 0.001 $Kg/mm^2$ is applied, it is impossible to apply such a tension that the filament does not loosen, while if a tension of more than 5 $Kg/mm^2$ is applied, the tension is too large and the filaments are broken, so that the tension is preferred to be 0.001–5 $Kg/mm^2$.

When the low molecular weight compounds are evaporated by the above described preliminary heating, the filaments shrink and bend but this bending can be prevented by applying a tension during the preliminary heating. In this case, the tension may be in such an amount that even if the filaments shrink in the above described preliminary heating, the formation of wave-shaped bending can be prevented and the good result can be obtained within a range of 0.001 to 20 Kg/mm². Even if a tension of less than 0.001 Kg/mm² is applied to the filaments, it is impossible to prevent the loosening of the filaments, while when a tension of more than 20 Kg/mm² is applied, the tension is too large and the filaments are broken, so that the tension applied to the filaments during the preliminary heating is preferred to be 0.001–20 Kg/mm².

It has been found that if a tension of 0.001 to 100 Kg/mm² is applied to the filaments in the above described baking at a high temperature of 800°–2,000° C, the orientation of silicon carbide crystal in the filaments is improved and that the strength of the filaments baked at a temperature of higher than 1,500° C under a tension is fairly higher than that of the filaments baked under no load of tension. When the tension is less than 0.001 Kg/mm², the effect of tension is not observed, while even if a tension of more than 100 Kg/mm² is applied, the effect does not vary and when the baking is effected under a tension of 0.01–50 Kg/mm², the strength becomes maximum. When the baking temperature is low as 800° C, the tension to be applied to the filaments is low, for example, 0.1 Kg/mm² and the baking temperature is raised and at the same time the tension is gradually increase, and for example, when the baking is completed under a tension of 30 Kg/mm², the orientation of silicon carbide crystal is improved and silicon carbide fibers having a high strength can be obtained.

In the method of the present invention, the stress to be applied in the baking is made by tension, twist or bending.

With respect to silicon carbide fibers obtained by baking the filaments at a high temperature under no stress and obtained by baking the filaments at a high temperature under a stress, the tensile strengths are compared hereinafter.

The filaments having a diameter of about 10 μ subjected to the preliminary heating were baked under a tension of 5 Kg/mm² and another filaments having the same diameter subjected to the preliminary heating were baked under no tension. The diameter of these silicon carbide fibers does not vary. However, the tensile strength of the silicon carbide fibers baked under no tension suddenly lowers from about 1,500° C of the baking temperature as shown in FIG. 6, while the tensile strength of the silicon carbide fibers baked under a tension of 5 Kg/mm² is small in the strength reduction even at a temperature of higher than 1,500° C as shown in FIG. 7 and the silicon carbide fibers having a high strength can be obtained.

When the baking at a high temperature is effected while applying ultrasonic wave to the filaments, the strength of the obtained silicon carbide fibers is improved. The ultrasonic wave having a frequency of 10 KHz to 30 MHz can be advantageously used. In the ultrasonic wave of less than 10 KHz, the object for improving the strength cannot be attained, while in the ultrasonic wave of more than 30 megaHz, the frequency is too large to improve the strength. The preferred frequency of the ultrasonic wave to be applied in the present invention is 20 KHz to 5 MHz. The strength of the silicon carbide fibers baked at a temperature of 800°–2,000° C while applying ultrasonic wave by means of a ultrasonic generator having an output of 100 W at a frequency of 500 KHz is shown in FIG. 8 and as seen from FIG. 8 the silicon crbide fibers having a constant strength can be obtained within a temperature range of 1,800° to 2,000° C.

If the above described tension and ultrasonic wave are simultaneously applied to the silicon carbide fibers, the orientation of silicon carbide crystal is more improved and the crystal is grown in a uniform direction and the silicon carbide fibers having an excellent orientation of silicon carbide crystal can be obtained. As an embodiment of the baking at a high temperature under both the function of the tension and the ultrasonic wave, a relation of the tensile strength to the baking temperature when the filaments having a diameter of 10 μ are baked at 800°–2,000° C, while applying a tension of 5 Kg/mm² and a ultrasonic wave of an output of 100 W at 300 KHz, is shown in FIG. 9 and as seen from FIG. 9, even in the silicon carbide fibers baked at about 2,000° C the decrease of tensile strength is not clear and silicon carbide fibers having a high strength can be produced.

The orientation of silicon carbide crystal in silicon carbide fibers obtained by baking the fibers under a tension was determined by electron diffraction. As such an embodiment, the electron diffraction of silicon carbide fibers baked at 2,000° C under a tension of 5 Kg/mm² is shown in FIG. 10. The electron diffraction of silicon carbide fibers baked at 2,000° C under no tension is shown in FIG. 11. In the above described electron diffraction photographs (FIGS. 10 and 11), the diffraction ring of the most inside is formed based on (111) plane of silicon carbide crystal, but in the case of the baking treatment under no stress, the direction of the silicon carbide crystal in silicon carbide fibers is irregular as shown in FIG. 11 and the crystals having all directions are mixed, so that the strength of the electron diffraction is uniform in all directions of 360° and the diffraction ring is uniform in the electron diffraction strength in all portions of the ring and therefore the blackness of the diffraction ring is uniform, while, in the electron diffraction of the silicon carbide fibers baked under a tension, the ring is larger in the diffraction strength only at a part of the diffraction ring, so that the blackness of the diffraction ring is very deep at a part and it can be seen that the orientation of the silicon carbide crystal in the fibers is very good. Since the orientation of the silicon carbide crystal is high, the strength of the crystalline silicon carbide fibers obtained by baking under a tension does not significantly lower as compared with the strength of non-crystalline silicon carbide fibers obtained by baking at a temperature of lower than 1,500° C.

In the present invention, it has been found that the silicon carbide fibers obtained by the preliminary heating at a low temperature and the baking at a high temperature often contain free carbon. However, when the fibers are burnt at a temperature of 600°–1,700° under an oxidizing atmosphere, the free carbon can be oxidized and removed. If such a burning under an oxidizing atmosphere is effected at a temperature of lower than 600° C, the free carbon cannot be oxidized, while when said burning is effected at a temperature of higher than 1,700° C, the free carbon can be easily oxidized, but a reaction for forming $SiO_2$ proceeds, so that such temperatures are not desirable. The time for oxidizing the free carbon varies depending upon the oxidizing temperature and the already treated temperature of the fibers. For example, when the fibers burnt at 1,200° C is treated under an oxidizing atmosphere at 800° C, 0.1–3 hours is preferable and in general, it is preferable to effect such a treatment at a low temperature for a relatively long time.

The silicon carbide fibers according to the present invention can be used in monofilament, yarn, robbing, cable, strand and filament.

The silicon carbide fibers according to the present invention are mainly formed from ultra fine grains of β-SiC crystal and the average grain sizes of the crystals of the fibers obtained by baking at a temperature of 1,100°, 1,300° and 1,500° C under vacuum are about 20 A, 30 A and 80 A and the silicon carbide fibers composed of such ultra fine grains of SiC crystals have never been heretofore known.

The tensile strength of the silicon carbide fibers according to the present invention is 200–800 Kg/mm² and Young's modulus is 10–40 ton/mm². The tensile strength and the Young's modulus were determined with respect to silicon carbide fibers obtained by baking at 1,300° C under vacuum and the result is shown in FIG. 12. The tensile strength and the young's modulus become larger, as the diameter of the fibers become smaller. Furthermore, as the diameter is smaller, the silicon carbide fibers become more flexible.

The tensile strength and Young's modulus at a high temperature of the silicon carbide fibers according to the present invention were determined up to a temperature of 1,400° C under vacuum and the obtained results are shown in FIG. 13. As seen from FIG. 13, the tensile strength and the Young's modulus of the silicon carbide fibers according to the present invention do not vary at all from room temperature to 1,400° C and the silicon carbide fibers of the present invention are inorganic fibers which can be satisfactorily used from room temperature to 1,400° C.

The silicon carbide fibers of the present invention are high in corrosion resistance and are not corroded at all, even if the fibers are immersed in hot hydrofluoric acid, hot mixed acid of hydrofluoric acid and sulfuric acid, hot aqua regia and the tensile strength and Young's modulus before and after the immersing do not vary at all.

Antioxidation was determined by heating the silicon carbide fibers of the present invention at 1,200° C for 100 hours in air but the fibers were not substantially oxidized and the tensile strength and the Young's modulus before the heating at 1,200° C are maintained even after the heating at 1,200° C.

The Young's modulus of the silicon carbide fibers according to the present invention is higher than that of the carbon fibers having the highest Young's modulus among various presently known fibers and is about 6 times of the glass fibers.

In the diffraction curve determined by X-ray diffraction method with respect to the silicon carbide fibers obtained by baking at 1,500° C under vacuum, there are three diffraction peaks of 2 $\theta \simeq 36°$, 60° and 72° as shown in FIG. 14 and it can be seen that the silicon carbide crystal in the fibers is β-SiC crystal.

Furthermore, the silicon carbide fibers baked at the above described various temperatures were measured by Pin hole method X-ray diffraction and the obtained diffraction photographs are shown in FIGS. 15 to 17.

FIG. 15 is the diffraction photograph of the silicon carbide fibers baked at 1,200° C under vacuum, FIG. 16 is the diffraction photograph of the silicon carbide fibers baked at 1,300° C under vacuum and FIG. 17 is the diffraction photograph of the silicon carbide fibers baked at 1,500° C under vacuum.

The ring in the most inside among the diffraction rings in the diffraction photograph is formed based on (111) plane of β-SiC crystal and as the baking temperature is raised, the diffraction ring becomes clear and this shows the growth of β-SiC crystal. Since the diffraction spot is not observed in the diffraction ring, it is apparent that β-SiC crystal is very small grain.

The average grain size of SiC crystal can be calculated from the following formula:

$$L = (0.9 \times \lambda)/(\beta \times \cos\theta)$$

L : average grain size (A)
λ : X-ray wave length (A)
β : width at half-maximum intensity (Radian)
θ : Brag angle The grain size of SiC crystals in silicon carbide fibers baked at various temperatures was calculated from the above formula. The average grain size of SiC crystal in the silicon carbide fibers baked at 1,200° C under vacuum is about 20 A, the average grain size of SiC crystal of the silicon carbide fibers baked at 1,300° C under vacuum is about 30 A and the average grain size of SiC crystal of the silicon carbide fibers baked at 1,500° C under vacuum is about 80° A. A relation of the baking temperature to the average grain size of SiC crystal in the silicon carbide fibers is shown in FIG. 18 and as the baking temperature becomes higher, the average grain size of SiC crystal becomes larger.

In the silicon carbide fibers according to the present invention, as the baking temperature in the production becomes higher, the tensile strength lowers and the average grain size of the crystal becomes larger. A relation of the baking temperature to the tensile strength and a relation of the tensile strength to the average grain size of SiC crystal as shown in FIGS. 18 and 19, respectively. From these figures, it is apparent that the grain size of the crystal and the tensile strength are in an inverse proportion and the reason why the silicon carbide fibers according to the present invention are very high in the tensile strength is presumably based on the fact that the silicon carbide fibers are constituted with the ultra fine grain crystals heretofore unknown.

SiC crystal in the silicon carbide fibers according to the present invention, which was obtained by baking at 1,500° C under vacuum was observed by an electron microscope of an ultra high voltage of an accelerating voltage of 1,000 KV and the obtained photographs are shown in FIGS. 20–23. FIG. 20 is a photograph of the silicon carbide fiber taken in 5,000 magnification and this shows that the surface of the fiber is very smooth. FIG. 21 shows a photograph of the silicon carbide fiber taken in 20,000 magnification and since the electron penetrates only the thin periphery portion, an image of SiC crystal grain can be observed and a very small number of the grains having 100–1,000 A are present between the grains of an average grain size of about 50 A which are distributed in the entire of the fiber. FIG. 22 shows a photograph of a cut end of the silicon carbide fiber taken in 20,000 magnification and a very small number of the large grains having 100–1,000 A are present between the grains having about 50 A which are distributed in the entire of the fiber. FIG. 23 is a photograph of a cut end of the silicon carbide fiber taken in 50,000 magnification and the grains having about 50 A are uniformly distributed and a very small number of large grains having 100–1,000 A are present between said ultra fine grains, but it can be seen that the grains mainly constituting the silicon carbide fiber are the ultra fine grains having about 50 A.

That is, the silicon carbide fibers according to the present invention are constituted with ultra fine grain of crystals.

The present invention will be explained in more detail.

For a better understanding of the invention, reference is taken to the accompanying drawings, wherein:

FIG. 1 is a diagram of an embodiment of apparatus for producing the organosilicon high molecular weight compounds;

FIG. 2 shows a relation of the residual weight to the heating temperature when the high molecular weight compounds containing low molecular weight compounds are heated;

FIG. 3 shows a relation of the residual weight to the heating temperature when the high molecular weight compounds containing low molecular weight compounds are heated under vacuum;

FIG. 4 shows X-ray diffraction patterns when the silicon high molecular weight compound filaments are heated at various temperatures;

FIG. 9 shows a relation of the tensile strength to the baking temperature when the spun filaments are baked while applying a tension together with ultrasonic wave;

FIGS. 10 and 11 show electron diffraction photographs of the silicon carbide fibers obtained by baking under a tension or no tension, respectively;

FIGS. 15–17 are X-ray diffraction photographs of Pin hole method of the silicon carbide fiber of the present invention;

FIGS. 20–23 show photographs obtained by observing SiC crystal in the silicon carbide fiber of the present invention through a super high voltage electron microscope.

Figure 5:
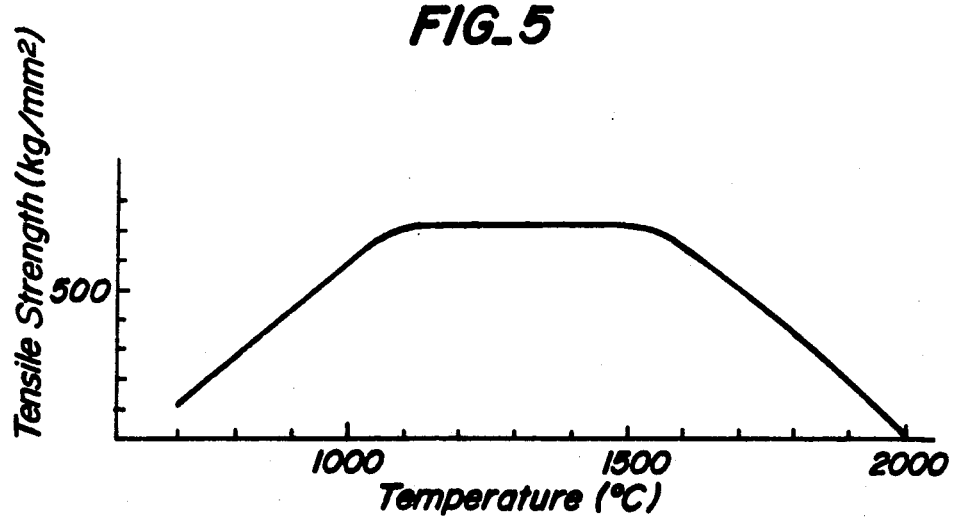
FIG. 5 shows a relation of the tensile strength to the heating temperature when the spun filaments according to the present invention are heated from 700° to 2,000° C.
Figure 6:
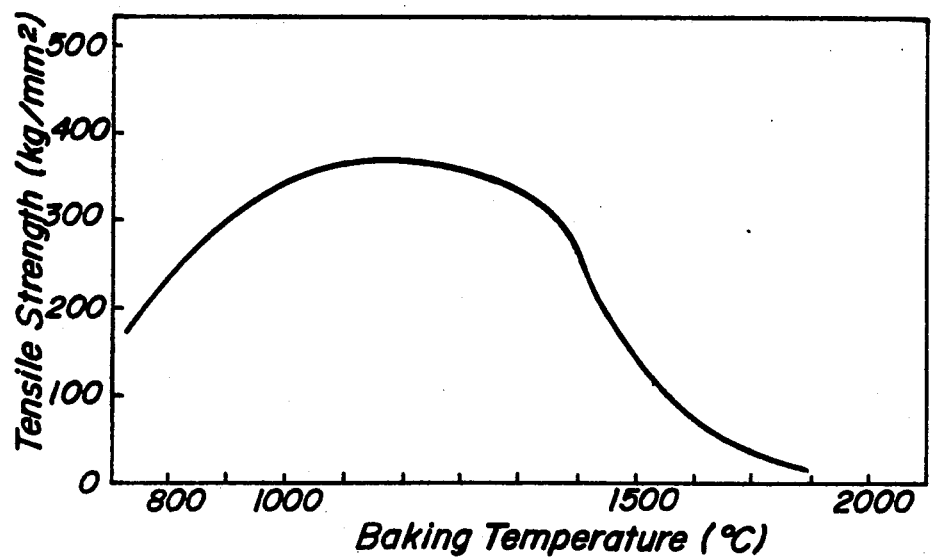
FIG. 6 shows a relation of the tensile strength to the baking temperature when the spun filaments are baked under no tension.
Figure 7:
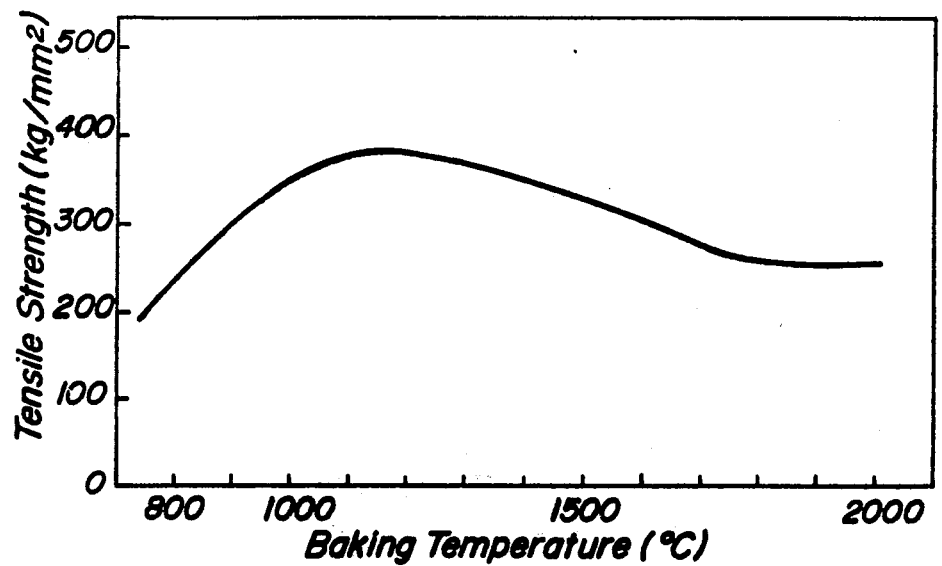
FIG. 7 shows a relation of the tensile strength to the baking temperature when the spun filaments are baked under a tension.
Figure 8:
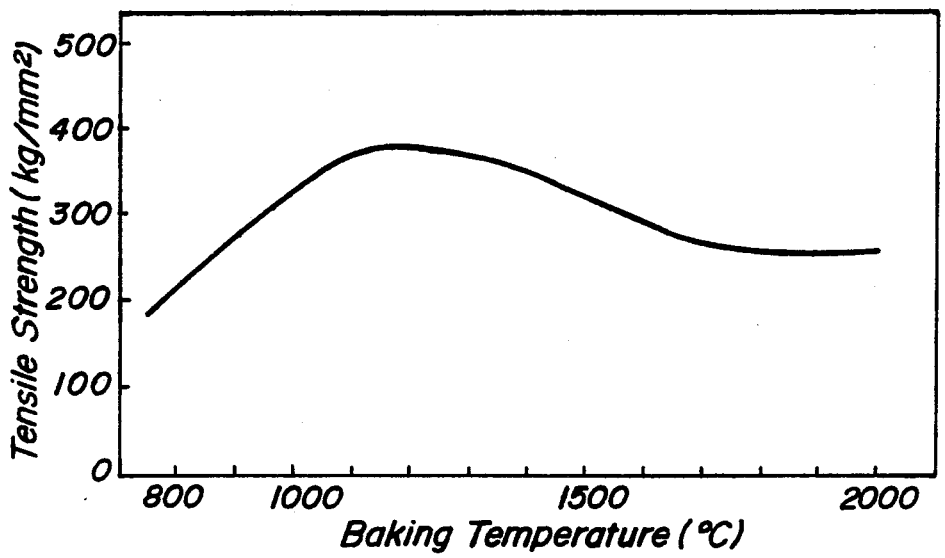
FIG. 8 shows a relation of the tensile strength to the baking temperature when the spun filaments are baked while applying ultrasonic wave.
Figure 12:
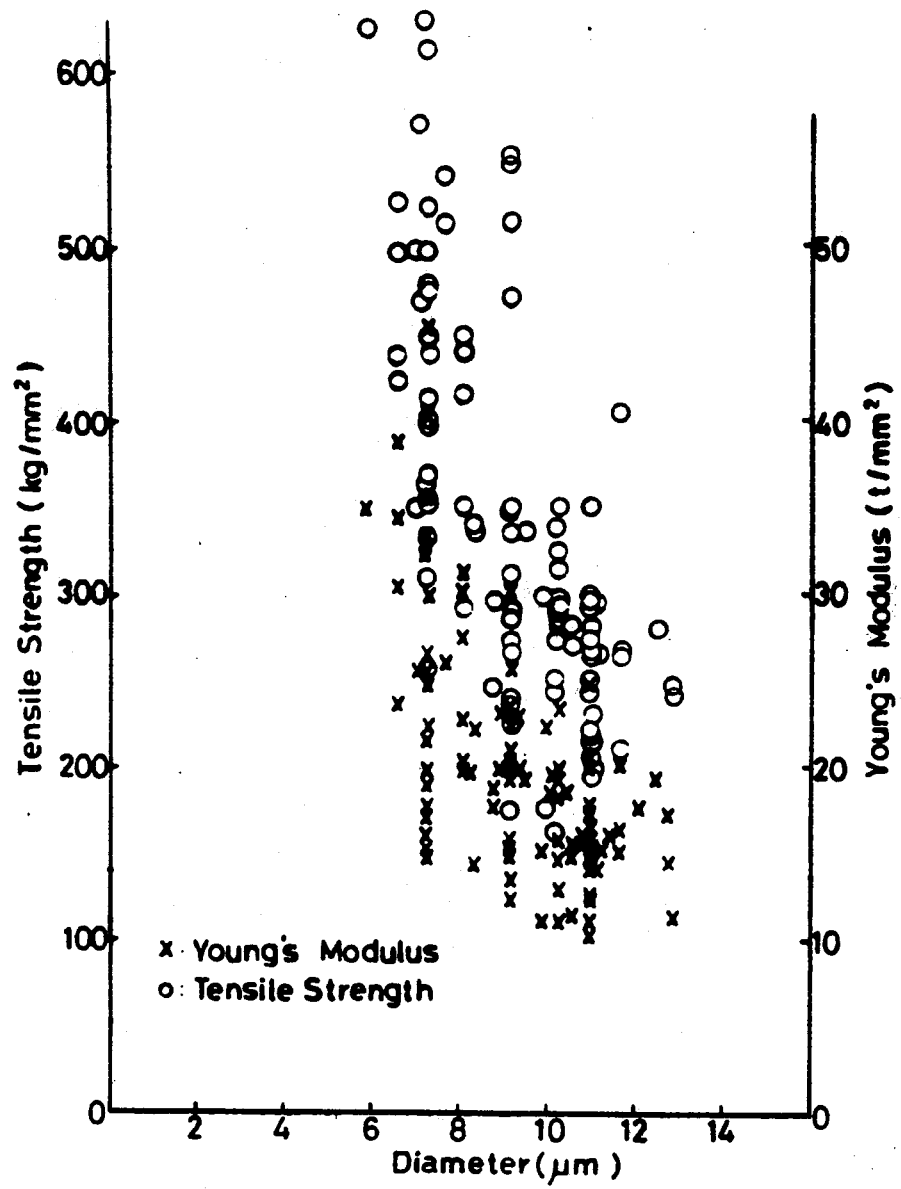
FIG. 12 shows relations of the tensile strength and the Young's modulus to the diameter of the silicon carbide fiber according to the present invention.
Figure 13:
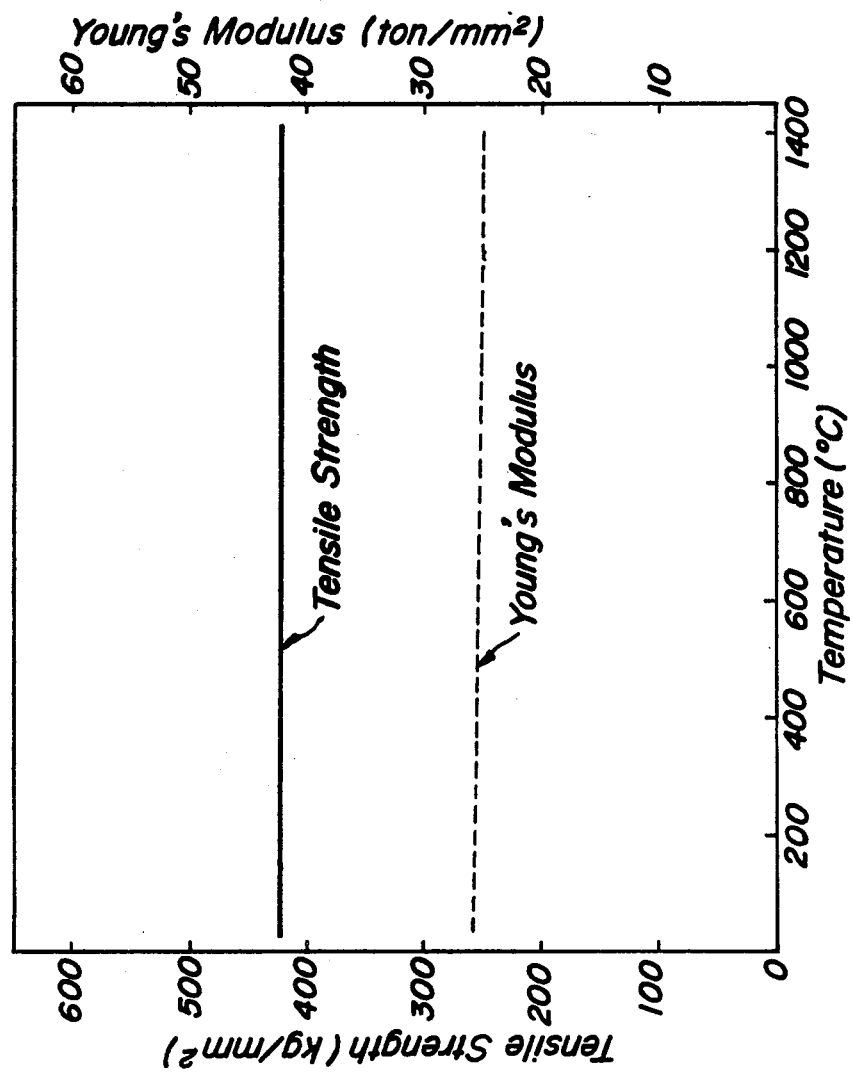
FIG. 13 is a diagram showing variations of the tensile strength and the Young's modulus based on temperature of the silicon carbide fiber according to the present invention.
Figure 14:
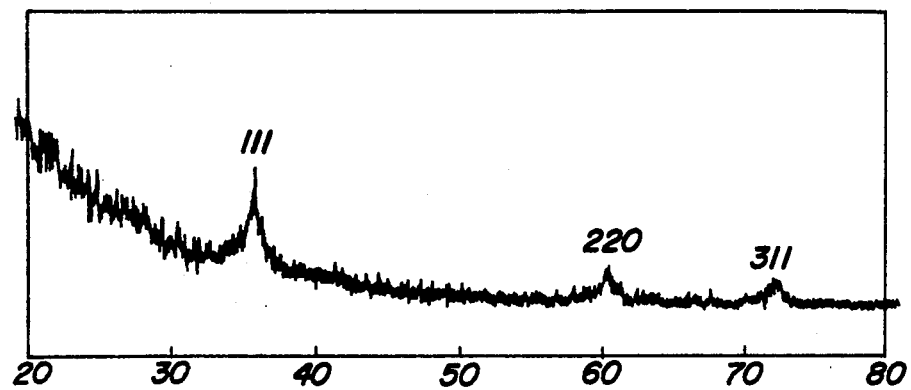
FIG. 14 shows an X-ray diffraction pattern of the silicon carbide fiber baked at 1,500° C.
Figure 18:
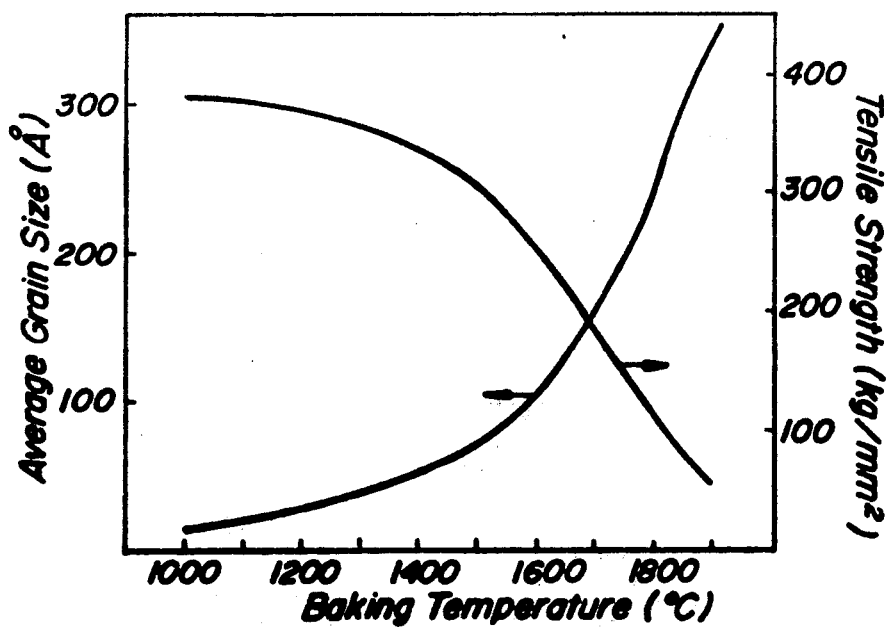
FIG. 18 is a diagram showing relations of the average grain size of SiC crystal and the tensile strength of the silicon carbide fiber of the present invention to the baking temperature.
Figure 19:
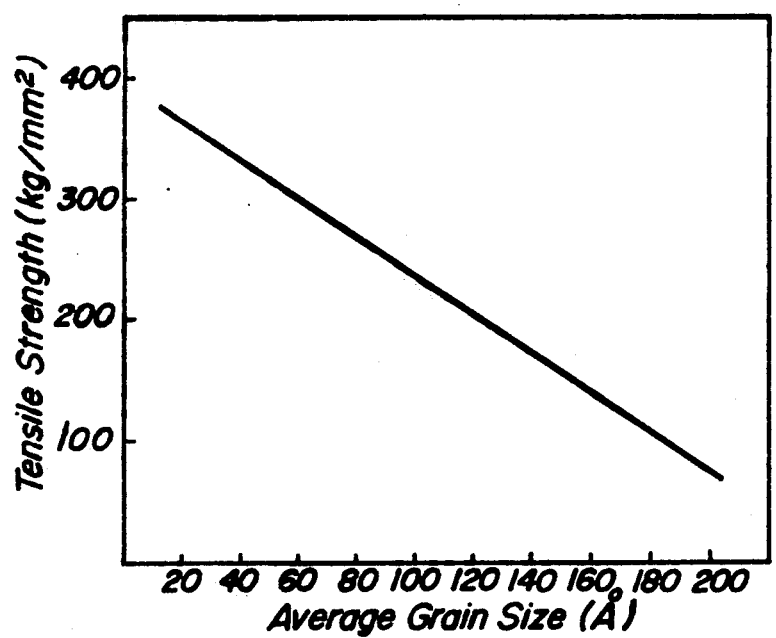
FIG. 19 is a diagram showing a relation of the tensile strength to the average grain size of SiC crystal of the silicon carbide fiber of the present invention.

The following examples are given for the purpose of illustration of this invention and are not intended as limitations thereof.

EXAMPLE 1

10 g of dodecamethylcyclohexasilane [(Me$_2$Si)$_6$] was fed in an autoclave and air in the autoclave was purged with argon gas and the polycondensation was effected at 400° C under 40 atmospheric pressure for 48 hours to obtain the organosilicon high molecular weight compounds of the present invention. The formed high molecular weight compounds were permitted to be cooled at room temperature and then added with ether to form ether solution. Said ether solution was taken out from the autoclave and ether was evaporated to obtain 6.6 g of a solid product. This solid product was dissolved in benzene and the solution was spun into filaments. The benzene soluble product had an average molecular weight of more than 1,500.

10 g of this organosilicon high molecular weight compound was dissolved in 100 cc of n-hexane and to the resulting solution was added 300 cc of acetone and the insoluble portion was about 60%. This insoluble portion was dissolved in benzene and the resulting solution was spun in a dry process at a spinning temperature of 20° C at a spinning rate of 10 m/min to obtain the organosilicon high molecular weight compound filaments having a diameter of 10 μ. The filaments were fully dried and then subjected to the preliminary heating to a temperature of 800°–1,000° C in about 2–48 hours, in an average time of 12 hours under vacuum (1×10$^{-3}$ mmHg) to obtain the filaments having black metal luster in a yield of 40–60%. The thus treated filaments were baked up to 1,800° C under argon atmosphere to obtain silicon carbide fibers.

A relation of the residual weight to the heating temperature up to the above described 1,000° C is shown in FIG. 2.

The tensile strength of the fibers heated to 1,800° C was 98 Kg/mm$^2$ and the tensile strength of the fibers heated to 1,000° C was 810 Kg/mm$^2$ and Young's modulus was 34 ton/mm$^2$.

EXAMPLE 2

10 g of linear polydimethylsilane

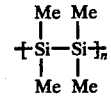

produced from dimethyldichlorosilane was charged in an autoclave and heated under argon atmosphere at 400° C under 50 atmospheric pressure for 48 hours. The reaction product was dissolved in ether and the solution obtained by removing the insoluble portion was evaporated to obtain 4.3 g of a solid product. This solid product had an average molecular weight distribution of 500–15,000 and was dissolved in 50 cc of hexane. The resulting solution was mixed with 200 cc of acetone to obtain precipitates. The precipitate was dissolved in benzene and the solution was spun in a dry process at 25° C into filaments having a diameter of 10 μ.

The thus obtained filaments were heated gradually to 1,000 C in 10 hours under vacuum. The tensile strength of the filaments was 723 Kg/mm² and Young's modulus was 36 ton/mm².

EXAMPLE 3

10 g of poly(dimethylsiltrimethylene),

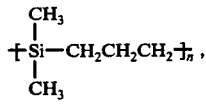

was dissolved in 100 cc of benzene, and the resulting solution was mixed with 400 cc of acetone to obtain 68 g of precipitate. The precipitate was dissolved in benzene, and the resulting solution was spun in a dry process at 30° C into filaments having a diameter of 10 μ. The spun filaments were fully dried and then heated gradually from room temperature to 800° C in 4 hours under vacuum to obtain silicon carbide filaments having metal luster in a yield of 59.8%. The resulting silicon carbide filaments had a strength of 610 Kg/mm² and Young's moduls of 29 ton/mm². The filaments were placed in a graphite crucible and baked up to 1,800° C under a tightly sealed condition. The thus treated fibers had a tensile strength of 80 Kg/mm².

EXAMPLE 4

50 g of poly(phenyleneoxysiloxane) was dissolved in 300 cc of benzene, and then 500 cc of acetone was added to the solution to obtain precipitates. The precipitates was dissolved in benzene, and the resulting solution was spun in a dry process at a spinning temperature of 50° C at a spinning rate of 150 m/min to obtain filaments having a diameter of 10 μ. The filaments were heated from room temperature to 800° C in 6 hours under vacuum ($1 \times 10^{-3}$ mmHg), and the heat treated filaments were further heat treated from 800° to 1,800° C under helium atmosphere to obtain silicon carbide fibers. The fibers had a tensile strength of 89 Kg/mm², and even when the fibers were kept in air at 1,500° C for 100 hours, the fibers did not change the weight. Therefore, the fibers were excellent in the oxidation resistance.

EXAMPLE 5

30 g of poly(dimethylsilphenylene),

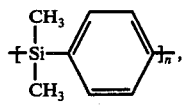

was dissolved in 200 cc of benzene, and the resulting solution was mixed with 500 cc of acetone to obtain 24.5 g of precipitate. The precipitate was dissolved in benzene, and the resulting solution was spun in a dry process at a temperature of 40° C to obtain filaments having a diameter of 10 μ. The spun filaments were heated from room temperature to 800° C in 4 hours under vacuum to obtain filaments in a yield of 65%. The filaments were further heat treated from 800° to 2,000° C under helium atmosphere to obtain filaments having a tensile strength of about 75 Kg/mm². Even when the filaments were kept in air at 1,500° C for 100 hours, the filaments did not change the weight, and the filaments were very excellent in the oxidation resistance.

EXAMPLE 6

10 g of dodecamethylcyclohexasilane was fed in an autoclave and air in the autoclave was purged with argon gas and the polycondensation reaction was effected at 400° C for 48 hours under 40 atmospheric pressure. After completion of the reaction, the polycondensation product was permitted to be cooled at room temperature, and then added with ether to form ether solution. The ether solution was taken out from the autoclave and ether was evaporated to obtain 6.6 g of a solid high molecular weight compound having an average molecular weight of about 1,800 and containing 40% of acetone-soluble low molecular weight compounds. The solid high molecular weight compound was heated and aged at 300° C for 8 hours while slowly stirring under atmospheric pressure in argon atmosphere to obtain an organosilicon high molecular weight compound having an average molecular weight of about 2,100.

The resulting organosilicon high molecular weight compound was dissolved in benzene, and the benzene solution was spun in a dry process to obtain filaments having a diameter of about 10 μ. The filaments were gradually heated from room temperature to 800° C in 6 hours under vacuum ($1 \times 10^{-3}$ mmHg) to effect the preliminary heating of the filaments, and then baked up to 1,800° C to obtain silicon carbide fibers.

Th tensile strength of the fibers heated to 1,200° C was 630 Kg/mm² and that of the fibers heated to 1,800° C was 85 Kg/mm².

EXAMPLE 7

The same solid high molecular weight compound as obtained in Example 6 was heated and aged at 250° C for 3 hours while slowly stirring in air to obtain an organosilicon high molecular weight compound having an average molecular weight of about 2,300. The resulting organosilicon high molecular weight compound was dissolved in xylene, and the xylene solution was heated at 42° C and spun into filaments having a diameter of about 10 μ. The filaments were gradually heated from room temperature to 800° C in 6 hours under vacuum ($1 \times 10^{-3}$ mmHg) to effect the preliminary heating of the filaments, and filaments having a diameter of about 8 μ were obtained. The preliminarily heat treated filaments were baked up to 1,800° C under argon atmosphere to obtain silicon carbide fibers having a tensile strength of 93 Kg/mm² and Young's modulus of 38 ton/mm². The tensile strength of the fibers baked at 1,000° C was 740 Kg/mm². When the fibers were kept at 1,500° C for 100 hours in air, the fibers did not change the weight.

EXAMPLE 8

10 g of linear polydimethylsilane,

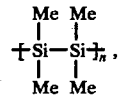

synthesized from dimethyldichlorosilane was fed in an autoclave, and air in the autoclave was purged with argon, and the polycondensation was effected at 400° C for 48 hours under 50 atmospheric pressure. The resulting polycondensation product was dissolved in ether, and ether-insoluble portion was removed from the ether solution, and ether was evaporated to obtain 4.3 g of a solid high molecular weight compound having an average molecular weight of about 7,500. The compound was heated and aged at 240° C for 2 hours under atmospheric pressure in gaseous ammonia atmosphere while slowly stirring to obtain a high molecular weight compound having an average molecular weight of about 8,400. The resulting high molecular weight compound was dissolved in benzene, and the benzene solution was spun into filaments having a diameter of about 10 μ. The filaments were gradually heated from room temperature to 800° C in 4 hours under vacuum ($1 \times 10^{-3}$ mmHg) to effect the preliminary heating of the filaments. The resulting filaments had a diameter of about 8 μ. The preliminarily heat treated filaments were further baked up to 2,000° C in a graphite crucible to obtain silicon carbide fibers, which had a tensile strength of 95 Kg/mm$^2$. The fibers baked at 1,000° C had a tensile strength of 810 Kg/mm$^2$ and Young's modulus of 31 ton/mm$^2$.

EXAMPLE 9 poly(diphenyleneoxysiloxane) having an average molecular weight of 11,000 was heated and aged at 350° C for 3 hours under 1 atmospheric pressure in hydrogen atmosphere while slowly stirring to obtain a high molecular weight compound having an average molecular weight of 14,000. The compound was dissolved in benzene, and the benzene solution was spun in a dry process into filaments having a diameter of about 10 μ. The filaments were gradually heated from room temperature to 800° C in 6 hours under vacuum ($1 \times 10^{-3}$ mmHg) to effect the preliminary heating of the filaments. The resulting filaments had a diameter of about 8 μ. The preliminarily heat treated filaments were further baked up to 1,800° C under vacuum to obtain silicon carbide fibers having a tensile strength of 80 Kg/mm$^2$. The fibers baked at 1,000° C had a tensile strength of about 780 Kg/mm$^2$ and Young's modulus of 41 ton/mm$^2$.

EXAMPLE 10

Methylchlorosilane was polycondensed according to Fritz's method (Angew. Chem., 79, 657 (1967)) to prepare a high molecular weight compound having an average molecular weight of 1,000. The high molecular weight compound was heated and aged at 400° C for 8 hours under 10 atmospheric pressure in nitrogen atmosphere to obtain a high molecular weight compound having an average molecular weight of 2,500. The aged high molecular weight compound was dissolved in xylene, and the xylene solution was heated at 35° C and spun into filaments having a diameter of about 10 μ. The filaments were gradually heated from room temperature to 800° C in 4 hours under vacuum ($1 \times 10^{-3}$ mmHg) to effect the preliminary heating of the filaments. The resulting filaments had a diameter of about 8 μ. The filaments were further baked up to 1,800° C argon atmosphere to obtain silicon carbide fibers having a tensile strength of 110 Kg/mm$^2$. The fibers baked at 1,000° C had a tensile strength of 750 Kg/mm$^2$ and Young's modulus of 29 ton/mm$^2$. Even when the fibers were kept at 1,500° C for 100 hours in air, the fibers did not change the weight.

EXAMPLE 11

The same high molecular weight compound as synthesized in Example 10 was heated and aged at 290° C for 3 hours under gaseous ammonia atmosphere. The aged high molecular weight compound had an average molecular weight of 2,400. The aged compound was dissolved in benzene, and the benzene solution was spun into filaments having a diameter of about 10 μ. The filaments were gradually heated from room temperature to 800° C in 6 hours under vacuum to effect the preliminary heating of the filaments. The filaments were further baked up to 1,800° C under vacuum to obtain silicon carbide fibers having a tensile strength of 89 Kg/mm$^2$. The fibers baked at 1,000° C had a tensile strength of 780 Kg/mm$^2$ and Young's modulus of 28 ton/mm$^2$.

EXAMPLE 12

10 g of octaphenylcyclotetrasilane was fed in an autoclave together with 0.1 g of benzoyl peroxide, and air in the autoclave was purged with argon gas, and the polycondensation was effected at 370° C for 24 hours under about 35 atmospheric pressure. After completion of the reaction, hexane was added to the autoclave, and the polycondensation product was taken out from the autoclave in the form of hexane solution. Insoluble portion in hexane was filtered off, and hexane was evaporated to obtain 7.1 g of solid high molecular weight compounds having an average molecular weight of about 8,000. The high molecular weight compounds were dissolved in 100 cc of hexane, and the hexane solution was added with 400 cc of acetone to obtain 6.3 g of acetone-insoluble precipitate. The precipitate was dissolved in benzene, and the benzene solution was spun in a dry process into filaments having a diameter of about 10 μ. The filaments was heated from room temperature to 800° C in 6 hours under vacuum ($1 \times 10^{-3}$ mmHg) to effect the preliminary heating of the filaments. The preliminary heated filaments were further baked up to 1,400° C in a graphite crucible to obtain silicon carbide fibers having a tensile strength of 350 Kg/mm$^2$ and Young's modulus of 25 ton/mm$^2$.

EXAMPLE 13

10 g of a mixture of cyclic dimethylpolysilanes having formulae of (Me$_2$Si)$_5$ and (Me$_2$Si)$_6$ was fed in an autoclave together with 0.5 g of azoisobutyronitrile, and air in the autoclave was purged with argon gas, and the polycondensation was effected at 400° C for 12 hours under about 80 atmospheric pressure. After completion for the reaction, benzene was add to the autoclave, and the polycondensation product was taken out from the autoclave in the form of benzene solution. In soluble portion in benzene was filtered off and benzene was evaporated under a reduced pressure to obtain 4.8 g of solid high molecular weight compounds having an average molecular weight of about 7,000. The high molecular weight compounds were dissolved in 50 cc of hexane, and the hexane solution was added with 200 cc of acetone to obtain 3.9 g of acetone-insoluble precipitates. The precipitate was dissolved in benzene, and the benzene solution was spun in a dry process into filaments having a diameter of about 10 μ. The filaments were gradually heated from room temperature to 800° C in 6 hours under vacuum ($1 \times 10^{-3}$ mmHg) to effect the preliminary heating of the filaments. The preliminary heated filaments were further baked up to 1,800° C under vacuum. The tensile strength of the fibers baked at 1,300° C was 780 Kg/mm², and that of the fibers baked at 1,800° C was 95 Kg/mm². Even when the fibers baked at 1,300° C were kept at 1,500° C for 120 hours in air, the fibers did not change the weight.

EXAMPLE 14

10 g of a mixture of cyclic diphenylsilane of the formula $(Ph_2Si)_4$, that of the formula $(Ph_2Si)_5$ and linear polydiphenylsilane was fed in an autoclave and air in the autoclave was purged with gaseous nitrogen, and the polycondensation was effected at 380° C for 50 hours under about 60 atmospheric pressure. After completion of the reaction, benzene was added to the autoclave, and the polycondensation product was taken out from the autoclave in the form of benzene solution, and the benzene solution was concentrated under a reduced pressure to obtain 6.9 g of solid high molecular weight compounds. The resulting high molecular weight compounds were dissolved in 50 cc of benzene, and the benzene solution was added with 200 cc of acetone to obtain 4.8 g of acetone-insoluble precipitates. The precipitate was dissolved in benzene, and the benzene solution was spun in a dry process into filaments having a diameter of about 10 μ. The filaments were gradually heated from room temperature to 800° in 6 hours under vacuum ($1 \times 10^{-3}$ mmHg) to obtain black filaments having metallic luster. The filaments were further baked up to 1,500° C under helium atmosphere to obtain silicon carbide fibers having a tensile strength of 300 Kg/mm².

EXAMPLE 15

Fluidized hexamethyldisilane was fed into a reaction column heated to 850° C at a feeding rate of 1 l/hr together with argon gas. The starting hexamethyldisilane was subjected to a decomposition reaction and a polycondensation reaction in the heated reaction column and formed into high molecular weight compounds, and at the same time low molecular weight compounds were formed. A part of the resulting high molecular weight compounds was able to be taken out from the heated reaction column. Major part of the high molecular weight compounds was fed into a separating column together with the low molecular weight compounds, and gases and the low molecular weight compounds were separated from the high molecular weight compounds in the column. The low molecular weight compounds were again fed into the heated reaction column and recycled. The operation was continued for 10 hours and 5.4 Kg of high molecular weight compounds having an average molecular weight of about 3,500 was obtained.

From 10 g of the resulting high molecular weight compounds, ethyl alcohol-soluble portion was removed by means of a Soxhlet's extractor to obtain 7.8 g of ethyl alcohol-insoluble portion, which was used as a spinning material. The ethyl alcohol-insoluble portion was dissolved in xylene, and the solution was heated to 45° C and spun into filaments having a diameter of about 10 μ. The spun filaments were heated from room temperature to 800° C in 6 hours under vacuum to effect the preliminary heating of the filaments. The filaments were further baked by heating up to 1,300° C under argon atmosphere. The tensile strength of the baked fibers was 450 Kg/mm² and Young's modulus was 27 ton/mm².

EXAMPLE 16

Poly(silmethylenesiloxane) having the following formula and an average molecular weight of about 24,000 was used as a starting material.

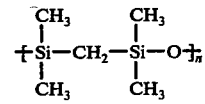

A content of the low molecular weight compounds soluble in acetone contained in this high molecular weight compound was less than 5% and the softening point of this high molecular weight compound was 100° C. This organosilicon high molecular weight compound was dissolved in benzene to form a spinning solution, which was spun into filaments having a diameter of about 10 μ. The spun filaments were subjected to a preliminary heating by raising the temperature from room temperature to 800° C in 4 hours under vacuum ($1 \times 10^{-3}$ mmHg) and then baked by heating up to 1,800° C under vacuum to obtain carbide fibers having a diameter of about 8 μ. The tensile strength of the fibers baked at 1,000° C was about 500 Kg/mm² and the tensile strength of the fibers baked at 1,800° C was about 65 Kg/mm².

EXAMPLE 17

Poly(silarylenesiloxane) having the following formula and an average molecular weight of 25,000 had a content of the low molecular weight compounds soluble in acetone being less than 7% and has a softening point of 180° C.

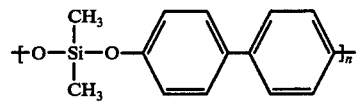

The organosilicon high molecular weight compound was dissolved in benzene and the resulting benzene solution was spun in a dry process to obtain filaments having a diameter of about 10 μ. The spun filaments were subjected to a preliminary heating by gradually raising the temperature from room temperature to 800° C in 6 hours under vacuum ($1 \times 10^{-3}$ mmHg) and then baked by raising the temperature up to 1,800° C to form silicon carbide fibers. The tensile strength of the fibers baked at 1,100° C was 530 Kg/mm² and the tensile strength of the fibers baked at 1,800° C was 70 Kg/mm².

EXAMPLE 18

A polysilmethylene having the following formula and an average molecular weight of about 27,000 had a content of the low molecular weight compounds soluble in acetone being less than 3% and had a softening point of 210° C.

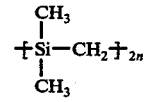

The organosilicon high molecular weight compound was dissolved in benzene and the resulting solution was spun in a dry process into filaments having a diameter of about 10 μ. The spun filaments were subjected to a preliminary heating by gradually raising the temperature from room temperature to 800° C in 6 hours under vacuum (1×10⁻³ mmHg). Then the filaments were baked by heating up to 1,800° C under vacuum. The tensile strength of the fibers baked at 1,300° C was 680 Kg/mm³ and the tensile strength of the fibers baked at 1,800° C was 70 Kg/mm².

EXAMPLE 19

Polysiltrimethylene having the following formula and an average molecular weight of about 28,000 had a content of the low molecular weight compounds soluble in acetone being 4.5% and had a softening point of 230° C.

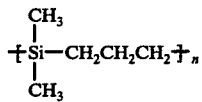

The organosilicon high molecular weight compound was dissolved in benzene and the resulting solution was spun in a dry process into filaments having a diameter of about 10 μ.

The filaments were subjected to a preliminary heating by raising the temperature form room temperature to 800° C in 6 hours under vacuum, and the thus treated fibers were baked by heating up to 1,800° C under argon atmosphere. The tensile strength of the fibers baked at 1,000° C was 580 Kg/mm², and the tensile strength of the fibers baked at 1,800° C was 76 Kg/mm².

EXAMPLE 20

10 g of cyclic polysilane (Ph₂Si)₅ was fed in an autoclave and the autoclave was substituted with argon gas and then said polysilane was reacted by heating at 420° C for 48 hours. After completion of the reaction, the reaction product was dissolved in benzene and the solution was taken out from the autoclave and the solution was filtered and then benzene was evaported under a reduced pressure to obtain 4.8 g of a solid high molecular weight compound. An average molecular weight of this high molecular weight compound was 18,000. The organosilicon high molecular weight compound had a content of the low molecular weight compound soluble in acetone being 5% and had a softening point of 130° C. The organosilicon high molecular weight compound was dissolved in xylene, and the solution was heated at 50° C to form a spinning bath, which was spun in a dry process into filaments having a diameter of about 10 μ. The spun filaments were subjected to a preliminary heating by raising temperature from room temperature to 800° C in 6 hours under vacuum (1×10⁻³ mmHg) and baked by heating up to 1,800° C to form silicon carbide fibers. The tensile strength of the fibers baked at 1,100° C was 480 Kg/mm² and the tensile strength of the fibers baked at 1,800° C was 55 Kg/mm².

EXAMPLE 21

Figure 24:
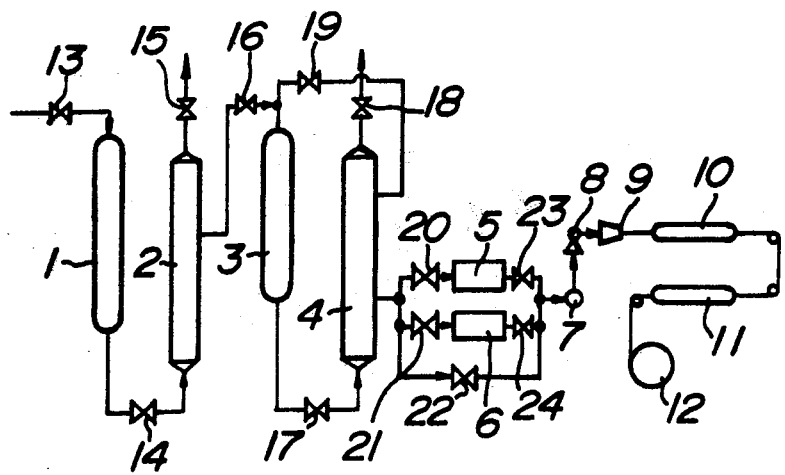
FIG. 24 is a diagram of an embodiment of apparatus for continuously effecting the method of the present invention.

An apparatus for producing silicon carbide fibers as shown in FIG. 24 was used and the entire of the apparatus was substituted with nitrogen gas. A mixed starting material of about 65% of dimethyldichlorosilane, about 25% of methyltrichlorosilane, about 5% of trimethylchlorosilane and about 5% of the other substances was charged in a primary reaction column 1 heated at 750° C at a rate of 5 l/hr. The reaction product formed in this column was introduced into a distillation column 2 and the gases consisting mainly of propane and hydrogen were separated from liquid. The liquid was introduced into a secondary reaction column 3 heated at 850° C to effect the thermal polycondensation reaction and then the reaction product was charged into a separating column 4 and separated into gas, low molecular weight compounds and high molecular weight compounds. Among them the gas was discharged from the column through a valve 18, the low molecular weight compounds were fed into the secondary reaction column 3 through a valve 19 as a recycling material. The yield of the above described high molecular weight compound was 19% and the average molecular weight was 2,400 and a content of acetone-soluble low molecular weight compounds was about 25%, so that the high molecular weight compound was fed into an aging vessel 5 through a valve 20 and aged at 350° C for 4 hours under atmospheric pressure. Thereafter, the thus aged product was filtered with a filter 7 and compressed with a pump 8 and spun through a spinneret 9 into filaments having a diameter of about 10 μ. The spinning temperature was about 40° C and the spinning rate was 20 m/min. The spun filaments were subjected to the preliminary heating through a preliminary heating apparatus 10 under vacuum having a length of 4 m, where the outlet temperature was 800° C, and then baked at 1,800° C in a baking oven 11 under argon atmosphere having a length of 2 m, in which the center was 1,800° C, to form silicon carbide fibers, which were wound up on a take-up device 12. The diameter of the formed silicon carbide fibers was about 7 μ, and the yield was about 11% based on the starting material. The tensile strength of the fiber was about 75 Kg/mm². When the baking was effected at 1,100° C, the tensile strength was 480 Kg/mm² and Young's modulus was 29 ton/mm².

EXAMPLE 22

Silicon carbide fibers were produced starting from dimethyldichlorosilane in the same manner as described in Example 21.

The dimethyldichlorosilane was charged in the primary reaction column 1 heated at 780° C at a rate of 8 l/hr. The reaction product was introduced into the distillation column 2, wherein the gases consisting mainly of propane and hydrogen were separated from liquid. The liquid was introduced into the secondary reaction column 3 heated at 880° C to effect the thermal polycondensation reaction. Then, the reaction product was separated into gas, low molecular weight compounds and high molecular weight compounds in the separating column 4.

The yield of the abovehigh molecular weight compound was 27%, and the average molecular weight was 3,200, and the content of acetone soluble low molecular weight compounds was 27%.

The high molecular weight compound was aged in the aging vessel 5, at about 380° C for about 3 hours, filtered, pumped and spun through the spinners 9 into filaments having a diameter of about 10 μ. The spinning temperature was about 45° C and the spinning rate was about 40 m/min. These spun filaments were subjected to the preliminary heating through the preliminary heating apparatus 10 having a length of 4 m, an inlet temperature of room temperature and an outlet temperature of 800° C under vacuum. Then, the thus treated filaments were baked up to 1,800° C in the baking oven 11 under vacuum to form silicon carbide fibers having a diameter of about 7 μ, which were wound up on the take-up device 12. The yield was about 17% based on the starting material. The tensile strength of the fiber was 95 Kg/mm². When the baking was effected at 1,000° C, the tensile strength was 540 Kg/mm² and Young's modulus was 31 ton/mm².

EXAMPLE 23

Silicon carbide fibers were produced starting from a mixture of about 78% of dimethyldichlorosilane, about 8% of methyltrichlorosilane, about 3% of trimethylchlorosilane, about 2% of methyldichlorosilane and about 9% of the other substances in the same manner as described in Example 21.

The mixture was charged in the primary reaction column 1 heated at 750° C at a rate of 6 l/hr. The reaction product was introduced into the distillation column 2, wherein the gases containing rich propane and hydrogen were separated from liquid. The liquid was introduced into the secondary reaction column 3 heated at 850° C to effect the thermal polycondensation reaction. Then, the reaction product was separated into gas, low molecular weight compounds and high molecular weight compounds in the separating column 4.

The yield of the above high molecular weight compound was 21% and the average molecular weight was 2,600 and the content of acetone soluble low molecular weight compounds was about 22%.

The high molecular weight compound was aged in the aging vessel 5 at 420° C for 3 hours, filtered with a filter 7, compressed with a pump 8 and spun through the spinneret 9 into filaments having a diameter of about 15 μ. These spun filaments were cut into fibers with a length of about 30 cm and subjected to the preliminary heating through the preliminary heating apparatus 10 under vacuum from room temperatures up to 800° C in 6 hours and then baked up to 1,800° C in carbon monoxide gas to form silicon carbide fibers. The diameter of the formed silicon carbide fibers was about 11 μ. The yield was 13% based on the starting material. The tensile strength of the fiber was 85 Kg/mm². When the baking was effected at 1,100° C, the tensile strength was 490 Kg/mm² and Young's modulus was 26 ton/mm².

EXAMPLE 24

Silicon carbide fibers were produced starting from a mixture of about 55% of diphenyldichlorosilane, about 35% of diphenyltrichlorosilane and about 10% of the other substances in the same manner as described in Example 21.

The mixture was charged in the primary reaction column 1 heated at about 800° C at a rate of 4 l/hr. The reaction product was introduced into the distillation column 2, wherein the gases consisting mainly of chlorine were separated from liquid. Next, the liquid was introduced into the secondary reaction column 3 heated at about 900° C to effect the thermal polycondensation reaction. Then, the reaction product was separated into gas, low molecular weight compounds and high molecular weight compounds in the separating column 4.

The yield of the above high molecular weight compound was 24% and the average molecular weight was about 5,000 and the content of acetone soluble low molecular weight compounds was about 5%.

The high molecular weight compound was directly filtered with the filter 7 without feeding into the aging vessel 5 and then spun through the spinneret 9 into filaments having a diameter of about 10 μ. The spun filaments were subjected to the preliminary heating through the preliminary heating apparatus 10 having a length of 4 m, an inlet room temperature and an outlet temperature of 800° C under vacuum and then baked up to 1,800° C under argon to form silicon carbide (SiC) fibers having a diameter of about 7 μ. The yield was 18% based on the starting material. The tensile strength of the fiber was 85 Kg/mm². When the baking was effected at 1,100° C, the tensile strength was about 430 Kg/mm² and Young's modulus was 26 ton/mm².

EXAMPLE 25

Silicon carbide fibers were produced starting from tetramethylsilane in the same manner as described in Example 21.

The tetramethylsilane was charged in the primary reaction column 1 heated at 780° C at a rate of 9 l/hr. The reaction product was introduced into the distillation column 2, wherein the gases consisting mainly of propane and hydrogen were separated from liquid. Next, the liquid was introduced into the secondary reaction column 3 heated at 880° C to effect the thermal polycondensation reaction. Then, the reaction product was separated into gas, low molecular weight compounds and high molecular weight polymers in the separating column 4.

The yield of the above high molecular weight compound was 16% and the average molecular weight was 2,800 and the content of acetone soluble low molcular weight compounds was 20%.

Then, the high molecular weight compound was aged in the aging vessel 5° at about 360° C for about 3 hours, filtered with the filter 7, compressed with the pump 8 and spun through the spinneret 9 into filaments having a diameter of about 10 μ. The spinning temperature was about 47° C and the spinning rate was about 50 m/min. These spun filaments were subjected to the preliminary heating through the preliminary heating apparatus 10 having a length of 4 m, an inlet room temperature and an outlet temperature of 300° C under vacuum. Then, the filaments were baked up to 1,800° C in the baking oven 11 under vacuum to form silicon carbide fibers having a diameter of about 7 μ, which were wound up on the take-up device 12. The yield was about 14% based on the starting material. The tensile strength of the fiber was 68 Kg/mm². When the baking was effected at 1,000° C, the tensile strength was 420 Kg/mm² and Young's modulus was 35 ton/mm².

EXAMPLE 26

Fifty grams of 1,3-disilacyclobutane was placed in an autoclave and, after air in the autoclave was purged with argon gas, polycondensation was effected at 410° C for 48 hours. After the completion of the reaction, the polycondensation product was taken up in benzene and then benzene was evaporated to obtain 41 g of solid high molecular weight compound. Since this compound contained 15% of acetone-soluble low molecular weight compound, it was dissolved in 200 cc of hexane and then added with 400 cc of acetone to obtain 35 g of acetone-insoluble precipitate. The precipitate was dissolved in benzene and spun into filaments having a diameter of about 10 μ by a dry process. The spun filaments are thoroughly dried and then subjected to a preliminary heating from room temperature to 800° C under vacuum ($1 \times 10^{-3}$ mmHg) in 6 hours. Then, the thus treated filaments were baked up to 2,000° C under argon atmosphere to form silicon carbide fibers. The tensile strength of the fiber was 48 Kg/mm². When the baking was effected at 1,000° C, the tensile strength was 430 Kg/mm² and Young's modulus was 39 ton/mm².

EXAMPLE 27

An organosilane high molecular weight compound was produced from tetramethyldisilphenylene (H(CH₃)₂Si-C₆H₄-Si(CH₃)₂H) and acetylene with a catalyst of H₂PtCl₆. This compound had an average molecular weight of about 6,000 and a content of acetone-soluble low molecular weight compound of 15%. Then, 30 g of the organosilane high molecular weight compound was dissolved in 200 cc of benzene and then added with 400 cc of acetone to obtain 26 g of precipitate. The precipitate was heated to 150° C and spun into filaments having a diameter of about 10 μ. These spun filaments was subjected to a preliminary heating from room temperature to 800° C under vacuum in 4 hours and then baked from 800° up to 2,000° C under argon atmosphere to form silicon carbide fibers. The tensile strength of the fiber baked at 1,200° C was 390 Kg/mm² and the tensile strength of the fiber baked at 2,000° C was 63 Kg/mm².

EXAMPLE 28

Polycondensation was effected with N,N'-diphenyl-diaminodimethylsilane

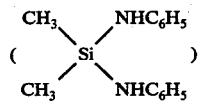

and p-dihydroxybenzene to produce an organosilane high molecular weight compound. This compound had an average molecular weight of about 7,000 and a content of acetone-soluble low molecular weight compound of 12%. After the low molecular weight compound was removed with ethyl alcohol in a Soxhelt's extractor, the residue was dissolved in benzene and spun into filaments having a diameter of about 10 μ by a dry process. These spun filaments were thoroughly dried and subjected to a preliminary heating from room temperature up to 800° C in 1 hour and then baked up to 1,800° C under vacuum to form silicon carbide fibers. The tensile strength of the fiber baked at 1,000° C was 410 Kg/mm² and the tensile strength of the fiber baked at 1,800° C was 43 Kg/mm².

EXAMPLE 29

Silicon carbide fibers were produced starting from tetramethyldichlorodisilane in the same manner as described in Example 21.

The tetramethyldichlorodisilane was charged in the primary reaction column 1 heated at 750° C at a rate of 11 l/hr. The reaction product was introduced into the distillation column 2, wherein the gases consisting mainly of propane and hydrogen were separated from liquid. Then, the liquid was introduced into the secondary reaction column 3 heated at 850° to effect the thermal polycondensation reaction. Next, the reaction product was separated into gas, low molecular weight compounds and high molecular weight compounds in the separating column 4.

The yield of the above high molecular weight compound was 14% and the average molecular weight was 2,100 and the content of acetone soluble low molecular weight compounds was about 28%.

The high molcular weight compound was aged in the aging vessel 5 at 350° C under argon atmosphere for 6 hours, filtered with the filter 7, compressed with the pump 8 and then spun through the spinneret 9 into filaments having a diameter of about 10 μ. These spun filaments were subjected to the preliminary heating through the preliminary heating apparatus 10 with a length of a 4 m and an outlet temperature of 800° C under vacuum and baked at 1,800° C in the baking oven 11 with a length of 2 m under argon atmosphere to form silicon carbide fibers, which were wound up on the take-up device 12. The silicon carbide fiber had a diameter of about 8 μ and a yield of about 10% based on the starting material. The tensile strength of the fiber was about 45 Kg/mm². When the baking was effected at 1,000° C, the tensile strength was about 430 Kg/mm² and Young's modulus was 33 ton/mm².

EXAMPLE 30

An organosilicon high molecular weight compound was produced by polycondensing p-bis(oxydimethylsilyl)benzene (HO(CH₃)₂SiC₆H₄Si(CH₃)₂OH) with potassium hydroxide catalyst. This compound had an average molecular weight of 3,500 and a content of acetone-soluble low molecular weight compound of about 21%. Then, 30 g of the high molecular weight compound was dissolved in 100 cc of benzene and added with 300 cc of acetone to obtain 21 g of precipitate. The precipitate was heated and spun into filaments having a diameter of about 10 μ by a dry process. These spun filaments were subjected to a preliminary heating from room temperature up to 800° C under vacuum in 4 hours and then baked up to 1,800° C under carbon monoxide atmosphere to form silicon carbide fibers. The tensile strength of the fiber baked at 1,000° C was 420 Kg/mm² and the tensile strength of the fiber baked at 1,800° C was 53 Kg/mm².

EXAMPLE 31

Silicon carbide fibers were produced starting from diacetoxydimethylsilane [(CH₃)₂Si(OCOCH₃)₂] in the same manner as described in Example 21.

The diacetoxydimethylsilane was charged in the primary reaction column 1 heated at about 750° C at a rate of 9 l/hr. The reaction product was introduced into the distillation column 2, wherein the gases were separated from liquid. Then, the liquid was introduced into the secondary reaction column 3 heated at about 850° C to effect the thermal polycondensation reaction. Next, the reaction product was separated into gas, low molcular weight compounds and high molecular weight compounds in the separating column 4.

The yield of the above high molecular weight compound was 13% and the average molecular weight was about 1,800 and the content of acetone soluble low molecular weight substance was about 35%.

The high molecular weight compound was aged in the aging vessel 5 at 390° C in air for 4 hours, filtered with the filter 7 and then spun through the spinneret 9 into filaments having a diameter of about 10 μ. These spun filaments were subjected to the preliminary heating through the preliminary heating apparatus 10 having a length of 4 mm, an inlet temperature of room temperature and an outlet temperature of 800° C under vacuum and then baked at 1,800° C in the baking oven 11 under argon atmosphere to form silicon carbide fibers having a diameter of about 8 μ. The yield was about 9% based on the starting material and the tensile strength of the fiber was 48 Kg/mm². When the baking was effected at 1,100° C, the tensile strength was about 410 Kg/mm² and Young's modulus was 37 ton/mm².

EXAMPLE 32

Dodecamethylcyclohexasilane was heat treated in an autoclave at 400° C for 48 hours to obtain organosilicon high molecular weight compounds. 10 g of the organosilicon high molecular weight compounds was dissolved in 100 cc of n-hexane and to the solution was added 300 cc of acetone and the insoluble portion was about 60%. This insoluble portion was dissolved in benzene and the resulting solution was spun in a dry process at a spinning temperature of 25° C at a spinning rate of 100 m/min to obtain filaments having a diameter of 10 μ. The filaments were fully dried and then subjected to a preliminary heating by raising the temperature to 800° C in about 6 hours under vacuum ($1 \times 10^{-3}$ mmHg).

The thus treated filaments were baked by heating to 1,800° C under argon atmosphere, while applying a tension of 5 Kg/mm² to obtain silicon carbide fibers. The tensile strength of the silicon carbide fibers baked at 1,800° C was 280 Kg/mm². While, the tensile strength of the silicon carbide fibers baked in the same manner as described above without applying the tension was 68 Kg/mm². This shows that the baking at a high temperature under a tension noticeably increases the tensile strength.

EXAMPLE 33

10 g of linear polydimethylsilane produced from dimethyldichlorosilane was fed in an autoclave and heated at 400° C under 50 atmospheric pressure for 48 hours under argon atmosphere. The reaction product was dissolved in ether and an insoluble portion was removed and the resulting solution was evaporated to obtain 4.3 g of a solid product. This solid product had an average molecular weight of 500–15,000 and was dissolved in 50 cc of hexane and to the resulting solution was added 200 cc of acetone to form precipitate. The precipitate was dissolved in benzene and the benzene solution was spun at 25° C in a dry process into filaments having a diameter of about 10 μ.

The spun filaments were subjected to a preliminary heating by gradually heating up to 700° C in 6 hours under vacuum.

The thus treated filaments were baked by raising the temperature from 700° to 2,000° C while applying ultrasonic wave having a frequency of 200 KHz generated from a ultrasonic wave generator of an output of 100 W, to form silicon carbide fibers. The tensile strength of the silicon carbide fibers baked at 1,700° C was 293 Kg/mm². While, the tensile strength of the silicon carbide fibers baked in the same manner as described above without applying the ultrasonic wave was 55 Kg/mm².

EXAMPLE 34

Poly(silmethylenesiloxane) having the following formula and an average molecular weight of about 24,000 was used as a starting material.

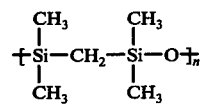

The organosilicon high molecular weight compound contained less than 5% of the low molecular weight compound soluble in acetone and this compound was dissolved in benzene to form a spinning solution, which was spun into filament having a diameter of about 10 μ. The spur filaments were subjected to a preliminary heating by raising the temperature from room temperature to 800° C in 4 hours under vacuum.

The thus treated filaments were baked by heating from 800° to 2,000° C, while applying ultrasonic wave having 300 KHz by means of an ultrasonic wave generator of an output of 100 W to obtain silicon carbide fibers. The formed silicon carbide fibers had a tensile strength of 275 Kg/mm². While, the tensile strength of the silicon carbide fibers baked in the same manner without applying the ultrasonic wave was 64 Kg/mm².

EXAMPLE 35

Dodecamethylcyclohexasilane was heat treated in an autoclave at 400° C for 48 hours to obtain organosilicon polymers. 10 g of the silicone polymers was dissolved in 100 cc of n-hexane and to the solution was added 300 cc of acetone and the insoluble portion was about 60%. This insoluble portion was dissolved in benzene and the resulting solution was spun in a dry process at a spinning temperature of 25° C at a spinning rate of 100 m/min through a spinning tube, to which a mixed gas of benzene, acetone and argon, the partial pressures of benzene, acetone and argon being 0.5, 0.3 and 0.2 atmospheric pressures respectively, was introduced, to obtain filaments having a diameter of 10 μ. The filaments were heated in air at 150° C for 30 minutes and then subjected to a preliminary heating by raising the temperature to 800° C in about 6 hours under vacuum ($1 \times 10^{-3}$ mmHg).

The thus treated filaments were baked by heating to 1,800° C under argon atmosphere to obtain silicon carbide fibers. The tensile strength of the silicon carbide fibers baked at 1,800° C was 68 Kg/mm², and that of the silicon carbide fibers baked at 1,300° C was 410 Kg/mm² and Young's modulus was 28 ton/mm².

EXAMPLE 36

10 g of linear polydimethylsilane

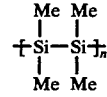

produced from dimethyldichlorosilane was fed in an autoclave and heated at 400° C under 50 atmospheric pressure for 48 hours under argon atmosphere. The reaction product was dissolved in ether and an insoluble portion was removed and the resulting solution was evaporated to obtain 4.3 g of a solid product. This solid product had an average molecular weight of 1,800 and was dissolved in 50 cc of hexane and to the resulting solution was added 200 cc of acetone to form precipitate. The precipitate was dissolved in benzene and the benzene solution was spun at 25° C in a dry process through a spinning tube, to which a gaseous mixture of benzene and air having a benzene partial pressure of 0.3 atmospheric pressure, was introduced, into filaments having a diameter of about 10 μ.

The spun filaments were heated at 200° C for 15 minutes in air containing ozone and subjected to a preliminary heating by gradually heating up to 700° C in 4 hours under vacuum.

The thus treated filaments were baked by raising the temperature to 1,800° C under vacuum to form silicon carbide fibers. The tensile strength of the silicon carbide fibers baked at 1,800° C was 65 Kg/mm$^2$.

EXAMPLE 37

10 g of dodecamethylcyclohexasilane was fed in an autoclave and air in the autoclave was purged with argon gas and the polycondensation reaction was effected at 400° C for 48 hours under 40 atmospheric pressure. After completion of the reaction, the polycondensation product was permitted to be cooled at room temperature, and then added with ether to form ether solution. The ether solution was taken out from the autoclave and ether was evaporated to obtain 6.6 g of a solid high molecular weight compound containing 40% of acetone-soluble low molecular weight compounds. The solid high molecular weight compound was heated and aged at 300° C for 8 hours while slowly stirring under atmospheric pressure in argon atmosphere to obtain an organosilicon high molecular weight compound containing 5% of acetone-soluble low molecular weight compounds.

The resulting organosilicon high molecular weight compound was dissolved in benzene, and the benzene solution was spun in a dry process to obtain filaments having a diameter of about 10 μ. The filaments were heated at 200° C for 30 minutes in air and then gradually heated up to 800° C in 6 hours under vacuum ($1 \times 10^{-3}$ mmHg) to effect the preliminary heating of the filaments, and then baked up to 1,800° C to obtain silicon carbide fibers.

The tensile strength of the fibers heated to 1,200° C was 650 Kg/mm$^2$ and that of the fibers heated to 1,800° C was 85 Kg/mm$^2$.

EXAMPLE 38

10 g of octaphenylcyclotetrasilane was fed in an autoclave together with 0.1 g of benzoyl peroxide, and air in the autoclave was purged with argon, and the polycondensation was effected at 320° C for 24 hours under about 35 atmospheric pressure. After completion of the reaction, hexane was added to the autoclave, and the polycondensation product was taken out from the autoclave in the form of hexane solution. Insoluble portion in hexane was filtered off, and hexane was evaporated to obtain 7.1 g of solid high molecular weight compounds having an average molecular weight of about 4,000. The high molecular weight compounds were dissolved in 100 cc of hexane, and the hexane solution was added with 400 cc of acetone to obtain 6.3 g of acetone-insoluble precipitate. The precipitate was dissolved in benzene, and the benzene solution was spun in a dry process through a spinning tube, to which a gaseous mixture of benzene and air having a benzene partial pressure of 0.3 atmospheric pressure, was introduced, into filaments having a diameter of about 10 μ. The filaments were heated at 180° C for 18 minutes in air and further heated up to 800° C in 6 hours under vacuum ($1 \times 10^{-3}$ mmHg) to effect the preliminary heating of the filaments. The preliminarily heated filaments were further baked up to 1,800° C in a graphite crucible to obtain silicon carbide fibers. The fibers baked at 1,000° C had a tensile strength of 510 Kg/mm$^2$, and fibers baked at 1,800° C had a tensile strength of 78 Kg/mm$^2$.

EXAMPLE 39

10 g of a mixture of cyclic dimethylpolysilanes having formulae of (Me$_2$Si)$_5$ and (Me$_2$Si)$_6$ was fed in an autoclave together with 0.5 g of azoisobutyronitrile, and air in the autoclave was purged with argon, and the polycondensation was effected at 400° C for 12 hours under about 80 atmospheric pressure. After completion of the reaction, benzene was add to the autoclave, and the polycondensation product was taken from the autoclave in the form of benzene solution. In soluble portion in benzene was filtered off and benzene was evaporated under a reduced pressure to obtain 4.8 g of solid high molecular weight compounds having an average molecular weight of about 3,800. The high molecular weight compounds were dissolved in 50 cc of hexane, and the hexane solution was added with 200 cc of acetone to obtain 3.9 g of acetone-insoluble precipitate. The precipitate was dissolved in benzene, and the benzene solution was spun in a dry process through a spinning tube, to which a gaseous mixture of benzene and air having a benzene partial pressure of 0.4 atmospheric pressure was introduced, into filaments having a diameter of about 10 μ. The filaments were heated at 150° C for 30 minutes in air and then gradually heated up to 800° C in 4 hours under vacuum ($1 \times 10^{-3}$ mmHg) to effect the preliminary heating of the filaments. The preliminarily heated filaments were further baked up to 1,800° C under vacuum. The tensile strength of the fibers baked at 1,300° C was 390 Kg/mm$^2$, and that of the fibers baked at 1,800° C was 95 Kg/mm$^2$.

EXAMPLE 40

10 g of a mixture of cyclic diphenylsilane of the formula (Ph$_2$Si)$_4$, that of the formula (Ph$_2$Si)$_5$ and linear polydiphenylsilane was fed in an autoclave and air in the autoclave was purged with gaseous nitrogen, and the polycondensation was effected at 380° C for 50 hours under about 60 atmospheric pressure. After completion of the reaction, benzene was added to the autoclave, and the polycondensation product was taken out from the autoclave in the form of benzene solution, and the benzene solution was concentrated under a reduced pressure to obtain 6.9 g of solid high molecular weight compounds. The resulting high molecular weight compounds were dissolved in 50 cc of benzene, and the benzene solution was added with 200 cc of acetone to obtain 4.8 g of acetone-insoluble precipitate. The precipitate was dissolved in benzene, and the benzene solution was spun in a dry process through a spinning tube, to which a gaseous mixture of benzene and argon having a benzene partial pressure of 0.25 atmospheric pressure was introduced, into filaments having a diameter of about 10 μ. The filaments were heated at 200° C for 15 minutes in air containing ozone and then gradually heated up to 800° C in 4 hours under argon atmosphere to obtain black filaments having metallic luster. The filaments had a tensile strength of 420 Kg/mm$^2$. The filaments were baked up to 1,300° C under helium vacuum to obtain silicon carbide fibers. Then said fibers were heated at 800° C for 2 hours in air. The tensile strength of the fibers baked at 1,300° C was 410

Kg/mm², and that of the fibers baked at 1,800° C was 73 Kg/mm².

EXAMPLE 41

Fluidized hexamethyldisilane was fed into a reaction column as shown in FIG. 1 heated to 850° C at a feeding rate of 1 l/hr together with argon gas. The starting hexamethyldisilane was subjected to a decomposition reaction and a polycondensation reaction in the heated reaction column and formed into high molecular weight compounds, and at the same time low molecular weight compounds were formed. A part of the resulting high molecular weight compounds was able to be taken out from the heated reaction column. Major part of the high molecular weight compounds was fed into a separating column together with the low molecular weight compounds, and gases and the low molecular weight compounds were separated from the high molecular weight compounds in the column. The low molecular weight compounds were again fed into the heated reaction column and recycled. The operation was continued for 10 hours and 5.4 Kg of high molecular weight compounds having an average molecular weight of about 3,500 was obtained.

From 10 g of the resulting high molecular weight compounds, ethyl alcohol-soluble portion was removed by means of a Soxhlet's extractor to obtain 7.8 g of ethyl alcohol-insoluble portion, which was used as a spinning material. The ethyl alcohol-insoluble portion was heated to 145° C and spun into filaments having a diameter of about 10 μ. The spun filaments were heated from room temperature to 200° C in 30 minutes in air and further heated up to 800° C in 6 hours under vacuum to effect the preliminary heating of the filaments. The preliminarily heated filaments had a tensile strength of 430 Kg/mm². The thus treated filaments were further baked by heating up to 1,800° C under argon atmosphere. The tensile strength of the baked fibers was 105 Kg/mm².

EXAMPLE 42

An apparatus for producing silicon carbide fibers as shown in FIG. 24, was used and the entire of the apparatus was substituted with nitrogen. A mixed starting material of about 65% of dimethyldichlorosilane, about 25% of methyltrichlorosilane, about 5% of trimethylchlorosilane, and about 5% of the other substances was charged in a primary reaction column 1 heated at 750° C at a rate of 5 l/hr. The reaction product formed in this column was introduced into the distillation column 2, wherein the gases consisting mainly of propane and hydrogen were separated from liquid. The liquid was introduced into a secondary reaction column 3 heated at 850° C to effect the thermal polycondensation reaction and then the reaction product was charged into a separating column 4 and separated into gas, low molecular weight compounds and high molecular weight compounds. Among them the gas was discharged from the column through a valve 18, and the low molecular weight compounds were fed into the secondary reaction column 3 through a valve 19 as a recycling material.

The yield of the above high molecular weight polymer was 19% and the average molecular weight was 2,400 and the content of acetone soluble low molecular weight compounds was about 25%.

The high molecular weight compounds were fed into an aging vessel 5 through a valve 20 and aged at 340° C for 4 hours under atmospheric pressure. Thereafter, the thus aged product was filtered with a filter 7, compressed with a pump 8 and then spun through a spinneret 9 into filaments havin a diameter of about 10 μ. The spinning temperature was 100° C and a mixture of benzene and air having a benzene partial pressure of 0.25 atmospheric pressure was supplied into the spinning tube and the spinning rate was 20 m/hr. These spun filaments were treated from room temperature up to 200° C in air for 30 minutes, subjected to a preliminary heating through a preliminary heating apparatus 10 with a length of 4 m and an outlet temperature of 800° C under vacuum and then baked to 1,800° C in a baking oven 11 with a length of 2 m under argon atmosphere to form silicon carbide fibers, which were wound up on a take-up device 12. The diameter of the formed silicon carbide fibers was about 7 μ, the yield was about 11% based on the starting material and the tensile strength was about 75 Kg/mm². When the baking was effected at 1,100° C, the tensile strength was 480 Kg/mm² and Young's modulus was 41 ton/mm².

EXAMPLE 43

Silicon carbide fibers were produced starting from dimethyldichlorosilane in the same manner as described in Example 42.

The dimethyldichlorosilane was charged in the primary reaction column 1 heated at 780° C at a rate of 8 l/hour. The reaction product was introduced into the distillation column 2, wherein the gases consisting mainly of propane and hydrogen were separated from liquid. Next, the liquid was introduced into the secondary reaction column 3 heated at 880° C to effect the thermal polycondensation reaction and then the reaction product was separated into gas, low molecular weight compounds and high molecular weight compounds in the separating column 4.

The yield of the above high molecular weight compounds was 27% and the average molecular weight was 3,200 and the content of acetone soluble low molecular weight compounds was 20%.

The high molecular weight compounds was aged in the aging vessel 5 at about 350° C for about 3 hours, filtered with the filter 7, compressed with the pump 8 and then spun through the spinneret 9 into filaments having a diameter of about 10 μ. The spinning temperature was about 45° C and the spinning rate was about 40 m/hr. These spun filaments were heated from room temperature up to 200° C in air containing ozone for 15 minutes, subjected to the preliminary heating through the preliminary heating apparatus 10 having a length of 4 m, an inlet room temperature and an outlet temperature of 800° under vacuum, and then baked at 1,800° C in the baking oven 11 under vacuum to form silicon carbide fiber having a diameter of about 7 μ, which were wound up on the take-up device 12. The yield was about 17% based on the starting material and the tensile strength of the fiber baked at 1,800° C was 95 Kg/mm². When the baking was effected at 1,000° C, the tensile strength was 430 Kg/mm² and Young's modulus was 37 ton/mm².

EXAMPLE 44

Silicon carbide fibers were produced starting from a mixture of about 78% of dimethyldichlorosilane, about 8% of methyltrichlorosilane, about 3% of trimethylchlorosilane, about 2% of methyldichlorosilane and about 9% of the other substances in the same manner as described in Example 42.

The mixture was charged in the primary reaction column 1 heated at 750° C at a rate of 6 l/hr. The reaction product was introduced into the distillation column 2, wherein gases were separated from liquid. Next, the liquid was introduced into the secondary reaction column 3 heated at 850° C to effect the thermal polycondensation reaction and then the reaction product was separated into gas, low molecular weight compounds and high molecular weight compounds in the separating column 4.

The yield of the above high molecular weight compounds was 21% and the average molecular weight was 2,600 and the content of acetone soluble low molecular weight compounds was about 22%.

The high molecular weight compounds was aged in the aging vessel 5 at 340° C for 3 hours, filtered with the filter 7, compressed with the pump 8 and then spun through the spinneret 9 into filaments having a diameter of about 15 μ. The spinning temperature was 75° C. These spun filaments were cut into a length of about 30 cm, heated from room temperature up to 150° C in air for 30 minutes, subjected to the preliminary heating from room temperature to 800° C under vacuum in 6 hours and then baked at 1,800° C under carbon monoxide atmosphere to form silicon carbide fibers. The diameter of the formed silicon carbide fibers were about 11 μ and the yield was 13% based on the starting material. The tensile strength of the fiber was 85 Kg/mm². When the baking was effected at 1,100° C, the tensile strength was 490 Kg/mm².

EXAMPLE 45

Silicon carbide fibers were produced starting from a mixture of about 55% of diphenyldichlorosilane, about 35% of diphenyltrichlorosilane and about 10% of the other substances in the same manner as described in Example 42.

The mixture was charged in the primary reaction column 1 heated at about 800° C at a rate of 4 l/hr. The reaction product was introduced into the distillation column 2, wherein the gases consisting mainly of hydrogen and hydrocarbon were separated from liquid. Next, the liquid was introduced into the secondary reaction column 3 heated at about 900° C to effect the thermal polycondensation reaction and then the reaction product was separated into gas, low molecular weight compounds and high molecular weight compounds in the separating column 4.

The yield of the above high molecular weight polymers was 24% and the average molecular weight was about 5,000 and the content of acetone soluble low molecular weight substances was about 5%.

The high molecular weight compounds was filtered with the filter 7 without ageing and then spun through the spinneret 9 into filaments having a diameter of about 10 μ. These spun filaments were heated from room temperature up to 180° C in air for 30 minutes, subjected to the preliminary heating through the preliminary heating apparatus 10 having a length of 4 m, an inlet room temperature and an outlet temperature of 800° C under vacuum and then baked at 1,800° C in the baking oven 11 under argon atmosphere to form silicon carbide fibers having a diameter of about 7 μ. The yield of the fiber was 18% based on the starting material. The tensile strength of the fiber was 85 Kg/mm². When the baking was effected at 1,100° C, the tensile strength was 430 Kg/mm².

EXAMPLE 46

Poly(silmethylenesiloxane) having the following formula and an average molecular weight of about 18,000 was used as a starting material.

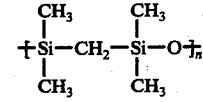

A content of acetone soluble low molecular weight substance contained in this high molecular weight compound was less than 10% and said organosilicon high molecular weight compound was dissolved in benzene to form a spinning solution, which was spun into filaments having a diameter of about 10 μ through a spinning tube using a mixed atmosphere of benzene and air and having a benzene partial pressure of 0.3 atmospheric pressure. These spun filaments were heated from room temperature up to 200° C in air for 10 minutes, subjected to a preliminary heating from room temperature up to 800° C under vacuum ($1\times10^{-3}$ mmHg) for 4 hours and then baked up to 1,800° C under vacuum to form silicon carbide fibers having a diameter of about 8 μ. The tensile strength of the fiber baked at 1,000° C was about 390 Kg/mm² and the tensile strength of the fiber baked at 1,800° C was about 65 Kg/mm².

EXAMPLE 47

Poly(silarylenesiloxane) having the following formula and an average molecular weight of about 16,000 had a content of acetone soluble low molecular weight substance of less than 10%.

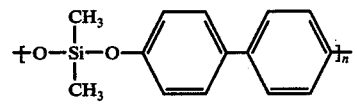

The organosilicon high molecular weight compound was dissolved in benzene to form a spinning solution. This spinning solution was spun into filaments having a diameter of about 10 μ through a spinning tube using a mixed atmosphere of benzene and air having a benzene partial pressure of 0.3 atmospheric pressure by a dry process. These spun filaments were heated from room temperature up to 200° C in ozone for 10 minutes, subjected to a preliminary heating from room temperature up to 800° C under vacuum ($1\times10^{-3}$ mmHg) in 6 hours, and then baked up to 2,000° C under argon atmosphere. Then the fibers were heated at 1,000° C in air for 1 hour to remove free carbon. The tensile strength of the fiber baked at 1,300° C was 390 Kg/mm² and the tensile strength of the fiber baked at 2,000° C was 65 Kg/mm².

EXAMPLE 48

Polysilmethylene having the following formula and an average molecular weight of about 20,000 had a content of acetone soluble low molecular weight compounds of less than 6%.

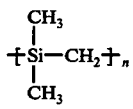

The organosilicon high molecular weight compound was dissolved in benzene to form a spinning solution. This spinning solution was spun into filaments having a diameter of about 10 μ through a spinning tube using a mixed atmosphere of benzene and air having a benzene partial pressure of 0.15 atmospheric pressure in a dry process. These spun filaments were heated from room temperature up to 200° C in air for 30 minutes, subjected to a preliminary heating from room temperature up to 800° C under vacuum ($1\times10^{-3}$ mmHg) in 12 hours, and then baked up to 1,800° C under vacuum. The tensile strength of the fiber baked at 1,300° C was 415 Kg/mm$^2$ and the tensile strength of the fiber baked at 1,800° C was 70 Kg/mm$^2$.

EXAMPLE 49

Polysiltrimethylene having the following formula and an average molecular weight of about 21,000 had a content of acetone soluble low molecular weight compound of less than 5%.

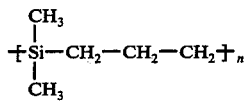

The organosilicon high molecular weight compound was dissolved in benzene to form a spinning solution. This spinning solution was spun into filaments having a diameter of about 10 μ through a spinning tube using a mixed atmosphere of benzene and air having a benzene partial pressure of 0.3 atmospheric pressure a dry process.

These spun filaments were heated from room temperature up to 200° C in air containing ozone for 15 minutes and subjected to a preliminary heating from room temperature up to 800° C under vacuum for 6 hours. The tensile strength of the fibers baked at 1,000° C was 390 Kg/mm$^2$ and the tensile strength of the fiber baked at 1,800° C under argon atmosphere was 95 Kg/mm$^2$.

EXAMPLE 50

Silicon carbide fibers were produced starting from tetramethylene in the same manner as described in Example 42.

The tetramethylsilane was charged in the primary reaction column 1 heated at 780° C at a rate of 9 l/hr. The reaction product was introduced into the distillation column 2, wherein gases consisting mainly of propane and hydrogen were separated from liquid. Next, the liquid was introduced into the secondary reaction column 3 heated at 880° C to effect the thermal polycondensation reaction and then the reaction product was separated into gas, low molecular weight compounds and high molecular weight compounds in the separating column 4.

The yield of the above high molecular weight compounds was 16% and the average molecular weight was 2,800 and the content of acetone soluble low molecular weight compounds was 20%.

The high molecular weight compound was aged in the ageing vessel 5 at about 360° C for about 3 hours, filtered with the filter 7, compressed with the pump 8 and then spun through the spinneret 9 into filaments having a diameter of about 10 μ. The spinning temperature was about 147° C and the spinning rate was about 50 m/min. These spun filaments were heated from room temperature up to 200° C in air containing ozone for 15 minutes, subjected to a preliminary heating through the preliminary heating apparatus 10 having a length of 4 m, wherein an inlet temperature was room temperature and an outlet temperature was 800° C, under vacuum and then baked up to 1,800° C in the baking oven 11 under vacuum to form silicon carbide fibers having a diameter of about 7 μ, which were wound up on the take-up device 12. The yield was about 14% based on the starting material and the tensile strength of the fiber was 68 Kg/mm$^2$. When the baking was effected at 1,000° C, the tensile strength was 420 Kg/mm$^2$ and Young's modulus was 36 ton/mm$^2$.

EXAMPLE 51

Fifty grams of 1,3-disilacyclobutane was charged into an autoclave and, after air inside the autoclave was purged with argon, polycondensation was effected at 410° C for 48 hours. After the completion of reaction, the polycondensation product was taken up in benzene and then benzene was evaporated to obtain 41 g of a solid high molecular weight compound. This high molecular weight compound contained 15% of acetone soluble low molecular weight compounds, so that it was dissolved in 200 cc of hexane and added with 400 cc of acetone to obtain 33 g of acetone insoluble precipitate. The precipitate was dissolved in benzene and then spun into filaments having a diameter of about 10 μ through a spinning tube using a mixed atmosphere of benzene and air having a benzene partial pressure of 0.28 atmospheric pressure in a dry process. These spun filaments were heated from room temperature up to 200° C in air for 30 minutes, subjected to a preliminary heating from room temperature up to 800° C under vacuum ($1\times10^{-3}$ mmHg) in 6 hours and then baked up to 2,000° C under argon atmosphere to form silicon carbide fibers. The tensile strength of the fiber baked at 1,000° C was 430 Kg/mm$^2$ and the tensile strength of the fiber baked at 2,000° C was 48 Kg/mm$^2$.

EXAMPLE 52

Dodecamethylcyclohexasilane was heat treated in an autoclave at 400° C for 48 hours to obtain organosilicon polymers. 100 g of the organosilicon polymers was dissolved in 100 cc of n-hexane and to the solution was added 700 cc of acetone to obtain about 60% of acetone insoluble portion. This insoluble portion was dissolved in xylene and the resulting solution was spun in a dry process at a spinning temperature of 34° C through a spinning nozzle having a diameter of 250 μ into a spinning tub wherein air was fed in a rate of 2 l/min, at spinning rate of 100 m/min to obtain filaments having a diameter of 20 μ. The spun filaments were heated in air at 200° C for 30 minutes under a tension of 50 g/mm$^2$. The thus treated filaments were subjected to a preliminary heating by raising the temperature from room temperature to 800° C in 3 hours under a tension of 200 g/mm$^2$ under vacuum ($1\times10^{-3}$ mmHg) and then baked by raising the temperature up to 1,700° C in a raising temperature rate of 200° C/hr under argon atmosphere to obtain silicon carbide fibers having no bent portion. The tensile strength of the silicon carbide fibers baked at 1,700° C was 45 Kg/mm² and the tensile strength of the fibers baked at 1,300° C was 415 Kg/mm² and the strength of the fibers was uniform.

EXAMPLE 53

100 g of linear polydimethylsilane produced from dimethyldichlorosilane was fed into an autoclave and heated at 400° C under 50 atmospheric pressure for 48 hours under argon atmosphere. The reaction product was dissolved in ether and the insoluble portion was removed and the resulting solution was evaporated to obtain 58 g of a solid product. This solid product had an average molecular weight of 1,400 and was dissolved in 60 cc of hexane and to the resulting solution was added 400 cc of acetone to obtain an insoluble precipitate in an yield of 65%. This precipitate was dissolved in toluene and the toluene solution was filtered to form a spinning solution. This spinning solution was spun in a dry process through a spinning nozzle having a diameter of 200 $\mu$ into a spinning tube wherein air having a partial pressure of benzene of 0.01 was supplied, at a spinning rate of 150 m/min at a spinning temperature of 25° C into filaments having a diameter of 10 $\mu$. The spun filaments were heated in air containing ozone at 200° C for 15 minutes under a tension of 50 g/mm². The treated filaments were subjected to a preliminary heating by raising the temperature from room temperature to 800° C in 4 hours under a tension of 100 g/mm² under argon gas. Then, the filaments were baked by raising the temperature up to 1,800° C at a raising temperature rate of 200° C/hr under argon atmosphere under a tension of 100 g/mm² to obtain crystalline silicon carbide fibers. The tensile strength of the fibers baked at 1,000° C was 370 Kg/mm² and the tensile strength of the fibers baked at 1,800° C was 80 Kg/mm². The thus obtained silicon carbide fibers had no bent portion and the tensile strength was uniform and the filaments were not substantially broken during the spinning.

EXAMPLE 54

Dimethyldichlorosilane and sodium were reacted in toluene to obtain an insoluble polysilane compound. 100 g of this polysilane was charged in an autoclave and air in the autoclave was substituted with nitrogen gas and the polysilane was heated at 400° C for 36 hours. The resulting product was dissolved in hexane and the resulting solution was taken out from the autoclave and filtered and then the hexane was distilled and removed. 55 g of the formed solid high molecular weight compounds was obtained. The softening point of the compounds was 38° C, so that the solid compounds were dissolved in 50 cc of hexane and to the solution was added 385 cc of acetone and 28 g of precipitate insoluble in acetone was obtained. 2 parts of the precipitate insoluble in acetone was mixed with 1 part of the acetone soluble portion and the mixture was heated and melted and filtered to form a spinning bath, which was heated at 210° C and spun through a nozzle having a diameter of 300 $\mu$ at a spinning rate of 1,000 m/min into filaments having a diameter of 10 $\mu$. The spun filaments were heated from room temperature to 180° C in 1 hour and maintained at 180° C for 30 minutes under a tension of 20 g/mm² in air. The thus treated filaments were subjected to a preliminary heating by raising the temperature from room temperature to 800° C in 3 hours under a tension of 100 g/mm² under nitrogen gas. Succeedingly, the thus treated filaments were baked by raising the temperature from 800° to 1,300° C in 2 hours to obtain silicon carbide fibers. The tensile strength of silicon carbide fibers baked at 1,300° C was 380 Kg/mm² and there was no bent portion in the fibers, so that the silicon carbide fibers having a uniform tensile strength were obtained.

EXAMPLE 55

100 g of dodecamethylcyclohexasilane was fed in an autoclave and air in the autoclave and purged with argon gas and the polycondensation reaction was effected at 400° C for 37 hours under 40 atmospheric pressure. After completion of the reaction, the polycondensation product was permitted to be cooled at room temperature and then added with ether to form ether solution. The ether solution was taken out from the autoclave and the ether was evaporated to obtain 66 g of a solid high molecular weight compound. The high molecular weight compounds contained the low molecular weight compounds and the softening point was lower than 50° C. The solid high molecular weight compounds were heated and aged at 300° C for 3 hours while slowly stirring under argon atmosphere to obtain organic silicone high molecular weight compounds having a softening point of 190° C.

The resulting organic silicone high molecular weight compounds were dissolved in xylene and the xylene solution was spun in a dry process through a spinning nozzle having a diameter of 300 $\mu$ at a spinning temperature of 25° C and at a spinning rate of 250 n/min into a spinning tube, wherein air was introduced, into filaments having a diameter of 10 $\mu$. The spun filaments were heated by raising the temperature from room temperature to 190° C in 1 hour and keeping 190° C for 15 minutes under a tension of 50 g/mm². The thus treated filaments were subjeceted to the preliminary heating by raising the temperature from room temperature to 800° C in 4 hours under vacuum while applying a tension of 200 g/mm² and further baked by raising the temperature to 1,600° C at a raising temperature rate of 300° C/min under vacuum. The tensile strength of the fibers baked at 1,200° C was 410 Kg/mm² and the tensile strength of the fibers baked at 1,600° C was 105 Kg/mm² and the fibers had no bent portion and the tensile strength of the fibers was very uniform.

EXAMPLE 56

100 g of octaphenylcyclotetrafuran was fed in an autoclave together with 1 g of benzoyl peroxide and air in the autoclave was purged with argon gas and the polycondensation was effected at 350° C for 24 hours under about 35 atmospheric pressure. After completion of the reaction, hexane was added to the autoclave and the polycondensation product was taken out from the autoclave in the form of the hexane solution. Insoluble portion in hexane was filtered off and the hexane was evaporated to obtain 71 g of solid high molecular weight compounds having an average molecular weight of about 2,000. The high molecular weight compounds were dissolved in 200 cc of hexane and to the hexane solution was added 1,000 cc of acetone to obtain 6.3 g of acetone insluble precipitate. The precipitate was dissolved in toluene and the toluene solution was spun in a dry process through a spinning nozzle having a diameter of 250 $\mu$ at a spinning temperature of 30° C and at a spinning rate of 150 m/min into filaments having a diameter of 10 $\mu$. The spun filaments were heated in air at 220° C for 18 minutes under a tension of 50 g/mm². The thus treated filaments were heated by raising the temperature from room temperature to 800° C in 4 hours under argon atmosphere while applying a tension of 200 g/mm². Then, the filaments were baked by raising the temperature up to 1,800° C in a graphite crucible to obtain silicon carbide fibers. The tensile strength of the fibers baked at 1,000° C was 350 Kg/mm² and the tensile strength of the fibers baked at 1,800° C was 78 Kg/mm² and the fibers had no bent portion and the tensile strength was very uniform.

EXAMPLE 57

100 g of a mixture of cyclodimethylpolysilanes having formulae of (Me$_2$Si)$_5$ and (Me$_2$Si)$_6$ was fed in an autoclave together with 3 g of azoisobutyronitrile and air in the autoclave was purged with argon gas and the polycondensation was effected at 360° C for 12 hours under about 80 atmospheric pressure. After completion of the reaction, benzene was added into an autoclave and the polycondensation product was taken out from the autoclave in the form of benzene solution. Insoluble portion in benzene was filtered off and benzene was evaporated under a reduced pressure to obtain 48 g of solid high molecular weight compounds having an average molecular weight of about 1,800. The high molecular weight compounds were dissolved in 100 cc of hexane and to the hexane solution was added 700 cc of acetone to obtain 39 g of acetone insoluble precipitate. The precipitate was dissolved in xylene and the solution was filtered off to obtain a spinning solution. This spinning solution was spun in a dry process through a spinning nozzle having a diameter of 200 $\mu$ at a spinning temperature of 45° C and at a spinning rate of 200 m/min into a spinning tube, wherein benzene having a partial pressure of 0.1 was introduced, into filaments having a diameter of 10 $\mu$.

The spun flaments were heated at 190° C in air for 30 minutes under a tension of 50 g/mm². The thus treated filaments were subjected to a preliminary heating by raising the temperature from room temperature to 800° C in 4 hours while applying a tension of 200 g/mm² and then baked by raising the temperature up to 1,300° C at a raising temperature rate of 200° C/hr under a tension of 100 g/mm² to obtain silicon carbide fibers. The tensile strength of the fibers baked at 1,300° C was 410 Kg/mm². The above described silicon carbide fibers had no bent portion and the tensile strength of the fibers were very uniform.

EXAMPLE 58

100 g of a mixture of cyclophenylsilanes having the formulae of (Ph$_2$Si)$_4$ and (Ph$_2$Si)$_5$ and linear polydiphenylsilane was fed into a autoclave and air in the autoclave was purged with nitrogen gas and the polycondensation was effected at 380° C for 50 hours under about 60 atmospheric pressure. After completion of the reaction, benzene was added into the autoclave and the polycondensation product was taken out from the autoclave in the form of benzene solution and the benzene solution was concentrated under a reduced pressure to obtain 69 g of the solid high molecular weight compounds. The resulting high molecular weight compounds were dissolved in 100 cc of benzene and to the benzene solution was added 700 cc of acetone to obtain 48 g of acetone insoluble precipitate. The precipitate was dissolved in benzene and the benzene solution was spun in a dry process through a spinning nozzle having a diameter of 300 $\mu$ into a spinning tube wherein air was introduced, at a spinning temperature of 25° C and at a spinning rate of 100 m/min, into filaments having a diameter of about 10 $\mu$.

The spun filaments were heated at 200 ° C for 15 minutes in air containing ozone gas under a tension of 50 g/mm². The thus treated filaments were subjected to a preliminary heating by gradually raising the temperature up to 800° C in 4 hours under argon gas while applying a tension of 500 g/mm². The filaments were baked by raising the temperature up to 1,800° C under vacuum to obtain silicon carbide fibers. The silicon carbide fibers were heated at 800° C for 0.5 hour in air. The tensile strength of the fibers baked at 1,300° C was 410 Kg/mm² and the tensile strength of the fibers baked at 1,800° C was 73 Kg/mm². The above described silicon carbide fibers had no bent portion and the tensile strength of the fibers was very uniform.

EXAMPLE 59

From hexamethyldisilane was produced the organosilicon high molecular weight compounds according to the present invention by using the apparatus as shown in FIG. 1 under atmospheric pressure. Namely, hexamethyldisilane was fed in a fluid form into a reaction column heated at 850° C at a feeding rate of 1 l/hr together with argon gas. The starting hexamethyldisilane was subjected to decomposition and polycondensation reaction in the heated reaction column and formed into high molecular weight compounds and at the same time low molecular weight compounds were formed. A part of the resulting high molecular weight compounds was able to be taken out from the heated reaction column but the major part of the high molecular weight compounds was fed into a separating column together with the low molecular weight compounds and in the separating column, gases and the low molecular weight compounds were separated from the high molecular weight compounds. The low molecular weight compounds were again fed into the reaction column and used as a recycling material. The operation was continued for 10 hours and 5.4 Kg of high molecular weight compounds having an average molecular weight of about 1,500 was obtained.

From 100 g of the resulting high molecular weight compounds, ethyl alcohol soluble portion was removed by means of Soxhlet's extractor to obtain 78 g of ethyl alcohol insoluble portion, which was used as a spinning material. The ethyl alcohol insoluble portion was dissolved in xylene and the solution was heated to 45° C and spun through a spinning nozzle having a diameter of 250 $\mu$ at a spinning rate of 100 m/min into filaments having a diameter of about 10 $\mu$. The spun filaments were heated by raising the temperature from room temperature to 200° C in 30 minutes in air under a tension of 50 g/mm².

The thus treated filaments were subjected to a preliminary heating by raising the temperature up to 800° C in 4 hours under a tension of 150 g/mm² under vacuum. The thus treated filaments were baked by raising the temperature up to 1,400° C under argon atmosphere under a tension of 100 g/mm² to obtain silicon carbide fibers. The tensile strength of the obtained fibers was 430 Kg/mm². The silicon carbide fibers had no bent portion and the tensile strength of long filament was very uniform.

EXAMPLE 60

An apparatus for producing silicon carbide fibers as shown in FIG. 24 was used and the entire of the apparatus was substituted with nitrogen. A mixed starting material of about 65% of dimethyldichlorosilane, about 25% of methyltrichlorosilane, about 5% of trimethylchlorosilane and about 5% of the other substances was charged in a reaction column 1 heated at 750° C at a rate of 1 l/hr to effect a thermal polycondensation reaction, whereby high molecular weight compounds and others were obtained. The reaction product was introduced into a distillation column 2, wherein the gases consisting mainly of methane and hydrogen were separated from liquid and high molecular weight compounds. Among them the gas was discharged out of the system and the liquid was again fed into the reaction column as a recycling material.

The yield of the above high molecular weight polymer was 34% and the average molecular weight was about 1,300 and the softening temperature was 35° C.

The high molecular weight compounds were aged at 280° C in nitrogen atmosphere for 4 hours, filtered and then spun through a spinning nozzle of 300 μ at 190° C at a rate of 1,000 m/min into filaments having a diameter of 20 μ. In this case, hot air was blown into the spinning tube. These spun filaments were heated up to 150° C in air containing ozone under a tension of 150 g/mm² in 30 minutes and then maintained at 210° C in air for 15 minutes. The thus treated filaments were heated from room temperature up to 800° C in nitrogen atmosphere under a tension of 500 g/mm² in 3 hours and then baked up to 1,400° C under argon atmosphere to from silicon carbide fibers. The silicon carbide fiber had a tensile strength of 390 Kg/mm² and uniformity of the tensile strength was very good because of no bent portion.

EXAMPLE 61

Organosilicon high molecular weight compounds were produced starting from dimethyldichlorosilane in the same manner as described in Example 60.

The dimethyldichlorosilane was charged in the reaction column 1 heated at 780° C at a rate of 1 l/hr. The reaction product was introduced into the distillation column 2, wherein the gases consisting mainly of methane and hydrogen were separated from liquid and high molecular weight polymers.

The yield of the above high molecular weight polymer was 24% and the average molecular weight was about 1,400, and the softening temperature was 45° C.

The high molecular weight polymer was aged at 210° C in air for 2 hours with slow stirring to obtain a high molecular weight compound having a softening temperature of 180° C. This high molecular weight compound was melted and filtered to obtain a spinning solution, which was spun into filaments having a diameter of 15 μ through nozzles of 300 μ at a spinning temperature of 200° C at a spinning tube rate of 500 m/min while blowing hot air into a spinning tube. These spun filaments were heated from room temperature up to 190° C in air under a tension of 50 g/mm² in 1 hour and maintained at 190° C for 30 minutes and subjected to a preliminary heating from room temperature up to 800° C in argon atmosphere under a tension of 200 g/mm² in 3 hours and further baked up to 1,700° C under argon atmosphere at a rate of 200° C/hr to form silicon carbide fibers. The tensile strength of the fiber baked at 1,300° C was 400 Kg/mm² and the tensile strength of the fiber baked at 1,700° C was 85 Kg/mm². The silicon carbide fiber had good strength properties because of no bent portion.

EXAMPLE 62

Poly(silmethylenesiloxane) having the following formula and an average molecular weight of about 8,000 was used as a starting material.

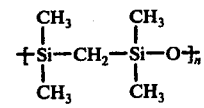

The softening point of the above described high molecular weight compound was higher than 50° C and this compound was melted and filtered to obtain a spilling melt. This melt was spun through a spinning nozzle having a diameter of 300 μ at a spinning temperature of 150° C and a spinning rate of 500 m/min into filaments having a diameter of 15 μ. The spun filaments were heated by raising the temperature from room temperature to 150° C in 1 hour and maintaining 150° C for 30 minutes in air containing ozone under a tension of 100 g/mm². The thus treated filaments were subjected to a preliminary heating by raising the temperature from room temperature to 800° C in 3 hours under vacuum and succeedingly, the temperature was raised to 1,400° C at a raising temperature rate of 200°C/hr to bake the filaments, whereby silicon carbide filbers were obtained. The tensile strength of the fibers baked at 1,400° C was 390 Kg/mm² and the fibers had no bent portion, so that tensile strength was very uniform.

EXAMPLE 63

Poly(silarylenesiloxane) having the following formula and an average molecular weight of 12,000 was used as a starting material.

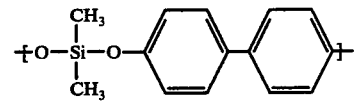

The softening point of the above described high molecular weight compound was 180° C and was melted and filtered to prepare a spinning melt. This metl was spun at a spinning temperature of 203° C through a spinning nozzle having a diameter of 250 μ at a spinning rate of 1,000 m/min into filaments having a diameter of 10 μ.

The spun filaments were heated by raising temperature to 180° C in 1.5 hours and keeping 180° C for 15 minutes in air under a tension of 200 g/mm², subjected to a preliminary heating by raising the temperature from room temperature to 800° C in 3 hours under a tension of 400 g/mm² in nitrogen gas. The thus treated filaments were baked by raising the temperature up to 1,700° C at a raising temperature rate of 200° C/hr under argon gas to obtain silicon carbide fibers. In the above described silicon carbide fibers, the tensile strength of the fibers baked at 1,000° C was 340 Kg/mm², the tensile strength of the fibers baked at 1,300° C was 380 Kg/mm² and the tensile strength of the fibers baked at 1,700° C was 65 Kg/mm². The fiber had no bent portion and the tensile strength in the long filaments was very uniform. EXAMPLE

EXAMPLE 64

Polysilmethylene having the following formula and an average molecular weight of about 4,000 was used as a starting material.

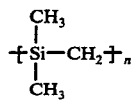

The above described high molecular weight compound had a softening point of lower than 50° C and was aged at 390° C for 2 hours under a nitrogen gas and then filtered to prepare a spinning melt. This melt was spun through a spinning nozzle having a diameter of 200 $\mu$ at a spinning temperature of 180° C and a spinning rate of 150 m/min into filaments having a diameter of 10 $\mu$. The spun filaments were heated by raising the temperature from room temperature to 160° C in 2 hours in air and then subjected to a preliminary heating by continuously and gradually passing through an oven having a length of 1 m, wherein the center portion was heated at 800° C, while applying a tension of 500 g/mm² under a nitrogen gas.

The thus treated filaments were baked by continuously and gradually passing through an oven having a length of 2 m where the center portion was heated at 1,300° C under argon gas to obtain silicon carbide fibers. The tensile strength of the fibers baked at 1,300° C was 340 Kg/mm² and the fibers had no bent portion and the tensile strength in the long filaments was very uniform.

EXAMPLE 65

Polysiltrimethylene having the following formula and an average molecular weight of about 6,000 was used as a starting material.

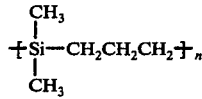

The above described polymer was heated and melted and then filtered. The filtered melt was spun through a spinning nozzle having a diameter of 240 $\mu$ at a spinning temperature of 140° C and a spinning rate of 1,200 m/min into filaments having a diameter of 10 $\mu$.

The spun filaments were heated by raising the temperature to 130° C in 1 hour and keeping 130° C for 15 minutes in air containing ozone under a tension of 150 Kb/mm² and then subjected to a preliminary heating by raising the temperature from room temperature up to 800° C in 3 hours under vacuum. The thus treated filaments were baked by raising the temperature to 1,600° C at a raising temperature rate of 200° C/hr in argon gas to obtain silicon carbide fibers. The tensile strength of the fibers baked at 1,000° C was 310 Kg/mm², the tensile strength of the fibers baked at 1,300° C was 380 Kg/mm² and the tensile strength of the fibers baked at 1,600° C was 108 Kg/mm². The fibers had no bent portion and the tensile strength of the fibers was very uniform.

EXAMPLE 66

250 g of polysilane was charged into the autoclave of 1 l and air in the autoclave was purged with argon gas and said polysilane was reacted at 470° C for 14 hours while stirring. The reaction product was dissolved in n-hexane and such a solution was taken out from the autoclave and filtered. Then, n-hexane was removed by reducing pressure by means of an aspirator to form a viscous product. This product was concentrated at 260° C under vacuum to obtain 130 g of silicon high molecular weight compounds having a softening point of 230° C and an intrinsic viscosity of 0.5.

The high molecular weight compounds were heated to 280° C and spun through a spinning nozzle having a diameter of 300 $\mu$ at a spinning rate of 300 m/min into filaments. The spun filaments were heated by raising the temperature from 10° to 150° C in 2.5 hours and from 150° to 180° C in 30 minutes and keeping 180° C for 30 minutes under air under a tension of 20 g/mm² to form oxide layer on the filament surface. The thus treated filaments were baked by raising the temperature to 1,300° C at a raising temperature rate of 100° C/hr under a tension of 200 g/mm² under vacuum and maintaining 1,300° C for 1 hour to obtain silicon carbide fibers. The tensile strength of the fibers was 350 Kg/mm² and the Young's modulus was 28 ton/mm².

The silicon carbide fibers obtained in the present invention having the tensile strength comparable with 300–400 Kg/mm² of piano wire, which is the highest in the tensile strength among steel materials, can be easily obtained and the specific gravity was about 3.0. The acid resistance, antioxidation and heat resistance of the fibers are excellent and the wetting to metals and alloys is better than that of carbon fibers and the reactivity with metals and alloys is poor, so that the fibers are very useful for fibrous materials of fiber reinforced metals, plastics and rubbers, electric heating fibers, fire proof cloth, acid resistant membrane, atomic furnace material, airplane construction material, bridges, building material, nuclear fusion furnace material, rocket material, radiation element, abrasive cloth, wire rope, marine developing material, golf shaft material, sky stock material, tennis racket material, fishing rods, shoe bottom materials and the like.

What is claimed is:

1. A method for producing silicon carbide fibers having a high tensile strength which comprises:
   (1) subjecting at least one organosilicon compound selected from (1) a compound having only Si-C bond, (2) a compound having Si-H bond other than Si-C bond, (3) a compound having Si-Hal bond, (4) a compound having Si-N bond, (5) a compound having Si-OR bond (R=alkyl or aryl), (6) a compound having Si-OH bond, (7) a compound having Si-Si bond, (8) a compound having Si-O-Si bond (9) an ester of organosilicon compound and (10 ) an oxide of organosilicon compound, to polycondensation to produce organosilicon high molecular weight compounds, in which silicon and carbon are the main skeleton components,
   (2) reducing the content of low molecular weight compounds mixed together with said high molecular weight compound by treating the mixture to produce the organosilicon high molecular weight compound having a softening point of higher than 50° C,
   (3) preparing a spinning solution from the thus treated organosilicon high molecular weight compound and spinning said spinning solution into fibers, (4) heating the spun fibers at a temperature of 50°–400° C under an oxidizing atmosphere to form an oxide layer on the filament surface, (5) preliminarily heating the spun fibers at a temperature of 350°–800° C under a non-oxidizing atmosphere to volatilize the remaining low molecular weight compounds, and (6) baking the thus treated fibers at a temperature of 800°–2,000° C under vacuum or at least one non-oxidizing atmosphere selected from the group consisting of an inert gas, CO gas and hydrogen gas.

2. The method of claim 1 wherein said mixture of low molecular weight compounds and high molecular weight compound is treated with a solvent that will preferentially dissolve the low molecular weight compounds.

3. The method as claimed in claim 2, wherein said solvent for reducing the content of the low molecular weight compound is an alcohol or acetone.

4. The method of claim 1 wherein the polycondensation is achieved by the addition of a catalyst selected from the group consisting of Na, KOH, $H_2SO_4$, $H_2PtCl_6$, benzoyl peroxide, di-tert.butyl peroxy-oxalate, di-tert.-butyl peroxide and azoisobutyronitrile.

5. The method of claim 1 wherein the polycondensation is achieved by irradiation.

6. The method of claim 1 wherein the polycondensation is achieved by heating.

7. The method of claim 1 wherein said mixture of low molecular weight compounds and high molecular weight compound is aged at a temperature of 50°–700° C.

8. The method of claim 1 wherein said mixture of low molecular weight compounds and high molecular weight compound is distilled at a temperature of 100°–500° C.

9. The method of claim 1 wherein said spinning solution is prepared by dissolving said organosilicon high molecular weight compound in a solvent selected from the group consisting of benzene, toluene, xylene, ethylbenzene, styrene, cumene, pentane, hexane, octane, cyclopentadiene, cyclohexane, cyclohexene, methylene chloride, chloroform, carbon tetrachloride, 1,1-dichloroethane, 1,2-dichloroethane, methylchloroform, 1,1,2-trichloroethane, hexachloroethane, chlorobenzene, dichlorobenzene, ethyl ether, dioxane, tetrahydrofuran, methyl acetate, ethyl acetate, acetonitrile and carbon disulfide.

10. The method of claim 1 wherein said spinning solution is prepared by heating and melting said organosilicon high molecular weight compound.

11. The method as claimed in claim 1 wherein said preliminarily heating (step 5) is effected under a tension of 0.001–20 Kg/mm².

12. The method as claimed in claim 1 wherein said baking (step 6) is effected under a tension of 0.001–100 Kg/mm² or ultrasonic wave having a frequency of 10 KHz – 20 MHz.

13. The method as claimed in claim 1 wherein said baking (step 6) is effected under exposure to an ultrasonic wave having a frequency of 10KHz – 20 MHz.

14. The method as claimed in claim 1, wherein said heating for forming the oxide layer on the fibers surface (step 4) is effected under a tension of 0.001–5 Kg/mm².

15. The method as claimed in claim 1, wherein said oxidizing atmosphere in the step (4) is air, ozone, oxygen, chloride gas or bromine gas.

16. The method as claimed in claim 1, wherein said oxidizing atmosphere in the step (4) is an aqueous solution of $KMnO_4$, $K_2Cr_2O_7$ or $H_2O_2$.

17. A method for producing silicon carbide fibers having a high tensile strength which comprises:
 (1) subjecting at least one organosilicon compound selected from (1) a compound having only Si-C bond,
 (2) a compound having Si-H bond other than Si-C bond,
 (3) a compound having Si-Hal bond, (4) a compound having Si-N bond, (5) a compound having Si-OR bond (R=alkyl or aryl), (69 a compound having Si-OH bond, (7) a compound having Si-Si bond, (8) a compound having Si-O-Si bond, (9) an ester of organosilicon compound and (10) an oxide of organosilicon compound, to polycondensation to produce organosilicon high molecular weight compounds, in which silicon and carbon are the main skeleton components,
 (2) reducing the content of low molecular weight compounds mixed together with said high molecular weight compound by treating the mixture to produce the desired organosilicon high molecular weight compound having a softening point of higher than 50° C,
 (3) preparing a spinning solution from the thus treated organosilicon high molecular weight compound and spinning said spinning solution into fibers,
 (4) preliminarily heating the spun fibers at a temperature of 350°–800° C under vacuum to volatilize the remaining low molecular weight compounds, and
 (5) baking the thus treated fibers at a temperature of 800°–2,000° C under vacuum or at least one nonoxidizing atmosphere selected from the group consisting of an inert gas, CO gas and hydrogen gas.

18. The method of claim 17 wherein said mixture of low molecular weight compounds and high molecular weight compound is aged at a temperature of 50°–700° C.

19. The method as claimed in claim 18, wherein said aging for reducing the content of the low molecular weight compound is effected under an atmosphere of air, oxygen or ammonia gas.

20. The method of claim 17 wherein the polycondensation is achieved by the addition of a catalyst selected from the group consisting of Na, KOH, $H_2SO_4$, $H_2PtCl_6$, benzoyl peroxide, di-tert.-butyl peroxy-oxalate, di-tert.-butyl peroxide and azoisobutyronitrile.

21. The method of claim 17 wherein the polycondensation is achieved by irradiation.

22. The method of claim 17 wherein the polycondensation is achieved by heating.

23. The method of claim 17 wherein said mixture of low molecular weight compounds and high molecular weight compound is treated with a solvent that will preferentially dissolve the low molecular weight compounds.

24. The method of claim 17 wherein said mixture of low molecular weight compounds and high molecular weight compound is distilled at a temperature of 100°–500° C.

25. The method of claim 17 wherein said spinning solution is prepared by dissolving said organosilicon high molecular weight compound in a solvent selected from the group consisting of benzene, toluene, xylene, ethylbenzene, styrene, cumene, pentane, hexane, octane, cyclopentadiene, cyclohexane, cyclohexene, methylene chloride, chloroform, carbon tetrachloride, 1,1-dichloroethane, 1,2-dichloroethane, methylchloroform, 1,1,2-trichloroethane, hexachloroethane, chlorobenzene, dichlorobenzene, ethyl ether, dioxane, tetrahydrofuran, methyl acetate, ethyl ether, dioxane, tetrahydrofuran, methyl acetate, ethyl acetate, acetonitrile and carbon disulfide.

26. The method of claim 17 wherein said spinning solution is prepared by heating and melting said organosilicon high molecular weight compound.

27. The method as claimed in claim 17, wherein said preliminary heating (step 4) is effected under a tension of 0.011–20 Kg/mm$^2$.

28. The method as claimed in claim 17, wherein said baking (step 5) is effected under s tension of 0.001–100 Kg/mm$^2$.

29. The method as claimed in claim 17 wherein said baking (step 3) is effected under exposure to an ultrasonic wave having a frequency of 10KHz – 20MHz.

30. The method as claimed in claim 17 wherein after the baking in step (5) the fibers are heated at a temperature of 600°–1,700° C under an oxidizing atmosphere to remove free carbon contained in the filaments as $CO_2$.

31. The method as claimed in claim 17, wherein said solvent for reducing the content of the low molecular weight compound is an alcohol or acetone.

32. A method for producing silicon carbide fibers having a high tensile strength which comprises
  (1) preparing a spinning solution from at least one organosilicon high molecular weight compound having a softening point of higher than 50° C, in which silicon and carbon are the main skeleton components, and spinning said spinning solution into fibers,
  (2) preliminarily heating the spun fibers at a temperature of 350°–800° C under vacuum to volatilize low molecular weight compounds contained therein, and
  (3) baking the thus treated fibers at a temperature of 800°–2,000° C under vacuum or at least one nonoxidizing atmosphere selected from the group consisting of an inert gas, CO gas and hydrogen gas, to form said silicon carbide fibers.

33. The method of claim 20 wherein said spinning solution is prepared by dissolving said organosilicon high molecular weight compound in a solvent selected from the group consisting of benzene, toluene, xylene, ethylbenzene, styrene, cumene, pentane, hexane, octane, cyclopentadiene, cyclohexane, cyclohexene, methylene chloride, chloroform, carbon tetrachloride, 1,1-dichloroethane, 1,2-dichloroethane, methylchloroform, 1,1,2-trichloroethane, hexachloroethane, chlorobenzene, dichlorobenzene, ethyl ether, dioxane, tetrahydrofuran, methyl acetate, ethyl acetate, acetonitrile and carbon disulfide.

34. The method of claim 32 wherein said spinning solution is prepared by heating and melting said organosilicon high molecular weight compound.

35. The method as claimed in claim 32, wherein said preliminary heating (step 2) is effected under a tension of 0.001–20 Kg/mm$^2$.

36. The method as claimed in claim 32, wherein said baking (step 3) is effected under a tension of 0.001–100Kg/mm$^2$.

37. The method as claimed in claim 32 wherein said baking (step 3) is effected under exposure to an ultrasonic wave having a frequency of 10KHz–20 MHz.

38. The method as claimed in claim 32, wherein after the baking in step (3), the fibers are heated at a temperature of 600°–1,700° C under an oxidizing atmosphere to remove free carbon contained in the filaments as $CO_2$.

39. A method for producing silicon carbide fibers having a high tensile strength which comprises:
  (1) subjecting polysilanes having Si-Si bond which have no halogen atoms to polycondensation reaction by at least one process of addition of a polycondensation catalyst, irradiation and heating to produce polycarbosilanes containing no halogen atoms,
  (2) reducing a content of low molecular weight compounds contained in said polycarbosilanes by treating the above described polycarbosilanes with at least one treatment of a solvent, aging said polycarbosilanes at a temperature of 50°–700° C and distilling said polycarbosilanes at a temperature of 100°–500° C, to produce the polycarbosilanes having a softening point of higher than 50° C,
  (3) dissolving the thus treated polycarbosilanes in a solvent or melting said polycarbosilanes to prepare spinning solution or spinning melt, and spinning said spinning solution or spinning melt into filaments,
  (4) baking the thus treated filaments at a temperature of 800°– 2,000° C, under vacuum or at least one non-oxidizing atmosphere selected from the group consisting of an inert gas, CO gas and hydrogen gas to form silicon carbide fibers.

40. The method as claimed in claim 39, wherein the spun filaments are treated under an oxidizing condition to form an oxide layer on the filament surface prior to the baking step (4).

41. The method as claimed in claim 39, wherein said polysilanes having Si-Si bond in the step (1) are polydimethylsilanes.

42. The method as claimed in claim 39, wherein said polycondensation reaction in the step (1) is effected in an autoclave.

43. The method as claimed in claim 39, wherein said baking in step (4) is effected at a temperature of 1,000°–1,500° C.

44. Continuous silicon carbide fibers having tensile strength of 200–800 Kg/mm$^2$, Young's modulus of 10–40 ton/mm$^2$ and resistant to corrosion and oxidation and showing no decrease in the tensile strength and Young's modulus at a high temperature of higher than 800° C, which are composed of ultra-fine grain silicon carbide having an average grain size of less than 0.1 $\mu$.

* * * * *